United States Patent
Pengov

[11] Patent Number: 5,852,334
[45] Date of Patent: Dec. 22, 1998

[54] STAGGERED POLE SWITCHED RELUCTANCE MOTOR

[75] Inventor: Wayne A. Pengov, Hillsboro, Ohio

[73] Assignee: Tridelta Industries, Inc., Mentor, Ohio

[21] Appl. No.: 545,085

[22] Filed: Oct. 19, 1995

[51] Int. Cl.⁶ .................. H02K 1/24; H02K 19/06
[52] U.S. Cl. .................. 310/168; 310/269; 310/162; 310/179; 310/193; 310/261; 318/201
[58] Field of Search .................. 310/168, 166, 310/254, 261, 216, 193, 186, 269, 49 R, 162, 179, 191, 209; 318/201; 340/815.64

[56] References Cited

U.S. PATENT DOCUMENTS

| | | | |
|---|---|---|---|
| 1,234,914 | 7/1917 | Latour | 310/168 |
| 4,583,015 | 4/1986 | Toshimitsu | 310/187 |
| 4,626,719 | 12/1986 | Foster | 310/49 R |
| 4,883,999 | 11/1989 | Herdershot | 310/254 |
| 4,995,159 | 2/1991 | Hancock et al. | 29/596 |
| 5,023,502 | 6/1991 | Johnson | 310/261 |
| 5,075,610 | 12/1991 | Harris | 318/701 |
| 5,111,095 | 5/1992 | Hendershot | 310/168 |
| 5,111,096 | 5/1992 | Horst | 310/168 |
| 5,294,856 | 3/1994 | Horst | 310/181 |
| 5,545,938 | 8/1996 | Mecrow | 310/156 |
| 5,701,065 | 12/1997 | Ishizaki | 318/701 |
| 5,719,456 | 2/1998 | Kolomeitsev | 310/112 |

FOREIGN PATENT DOCUMENTS

695020A2  1/1996  European Pat. Off. ....... H02K 29/00

OTHER PUBLICATIONS

T.J.E. Miller; Switched Reluctance Motors and their control, 1993, pp. 2–3, 8–9, 14–15, 26–47, New York.

Primary Examiner—Nestor R. Ramirez
Assistant Examiner—Karl Eizo I. Tamai
Attorney, Agent, or Firm—Mark Kusner

[57] ABSTRACT

A switched reluctance machine includes a first element having a plurality of uniform poles and a second element having a first pole and a second pole. The first pole has a wide face and the second pole has a narrow pole face. The first and second elements are disposed for movement relative to each other such that the wide and narrow poles are moveable in spaced relation to the plurality of uniform poles.

28 Claims, 25 Drawing Sheets

0 DEGREES

30 DEGREES

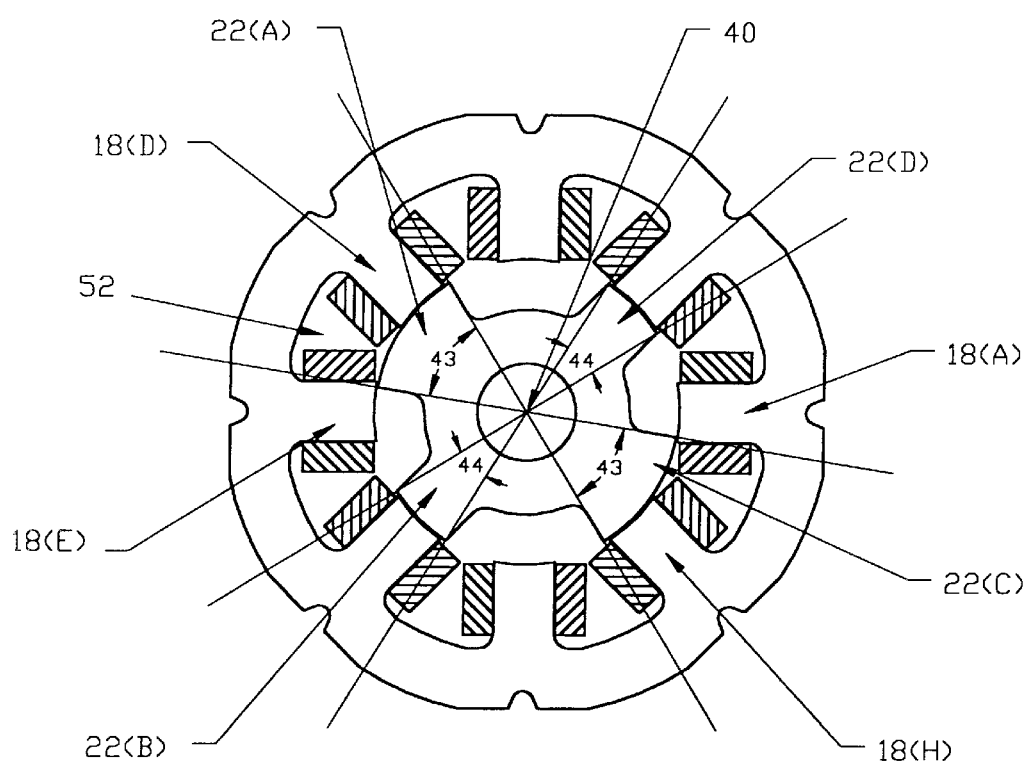

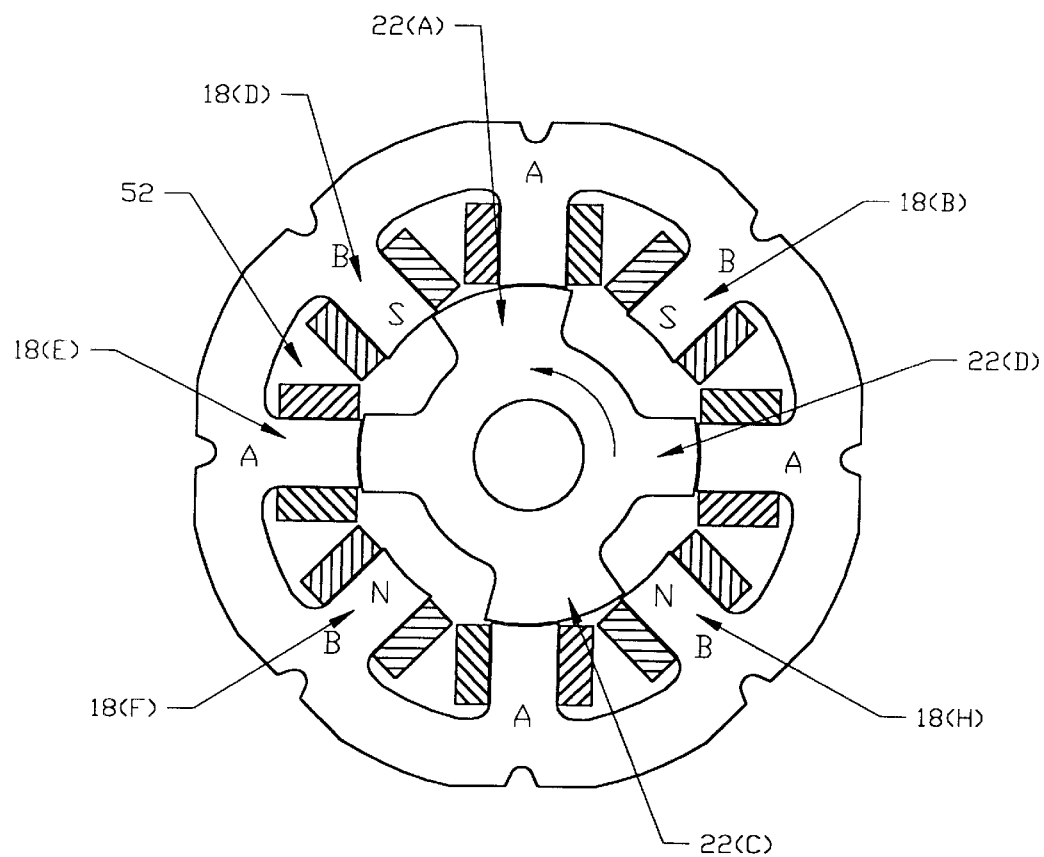

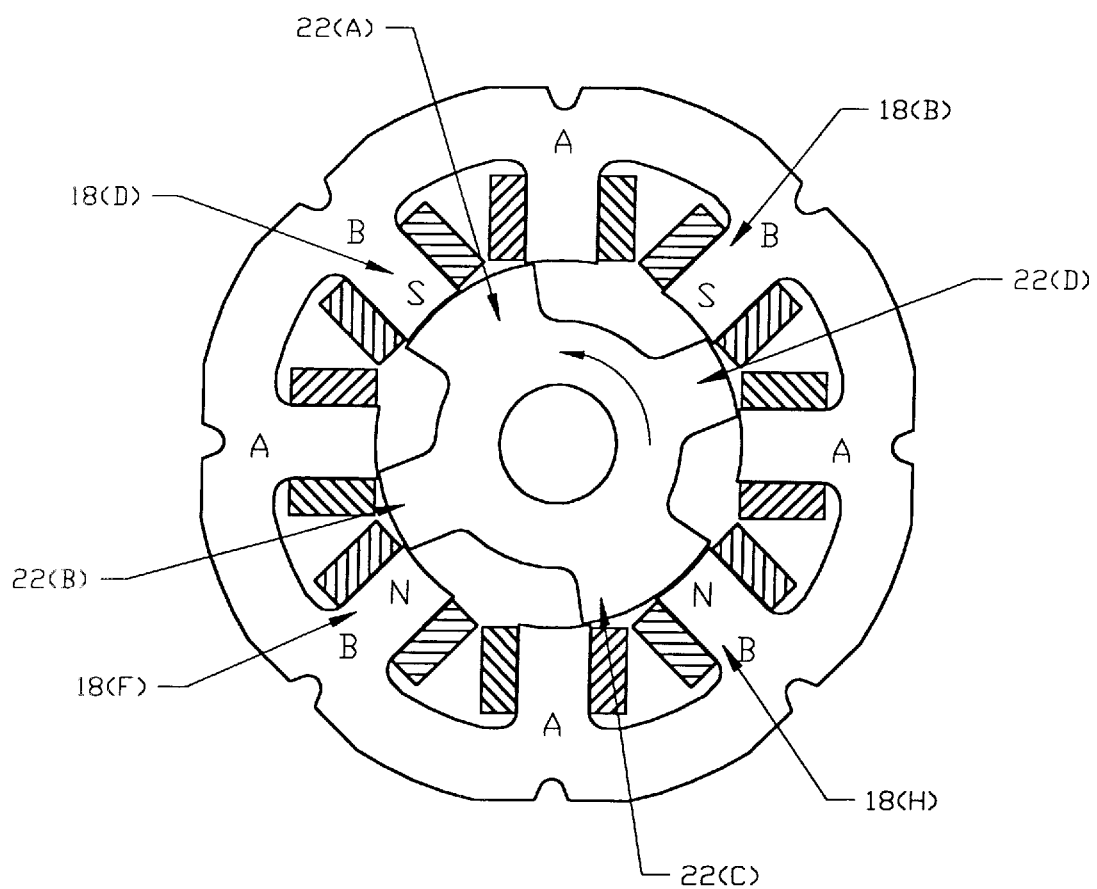

30 DEGREES

45 DEGREES 67.5 DEGREES

90 DEGREES 0 deg 22.5 deg 30 deg 45 deg 67.5 deg 90 deg

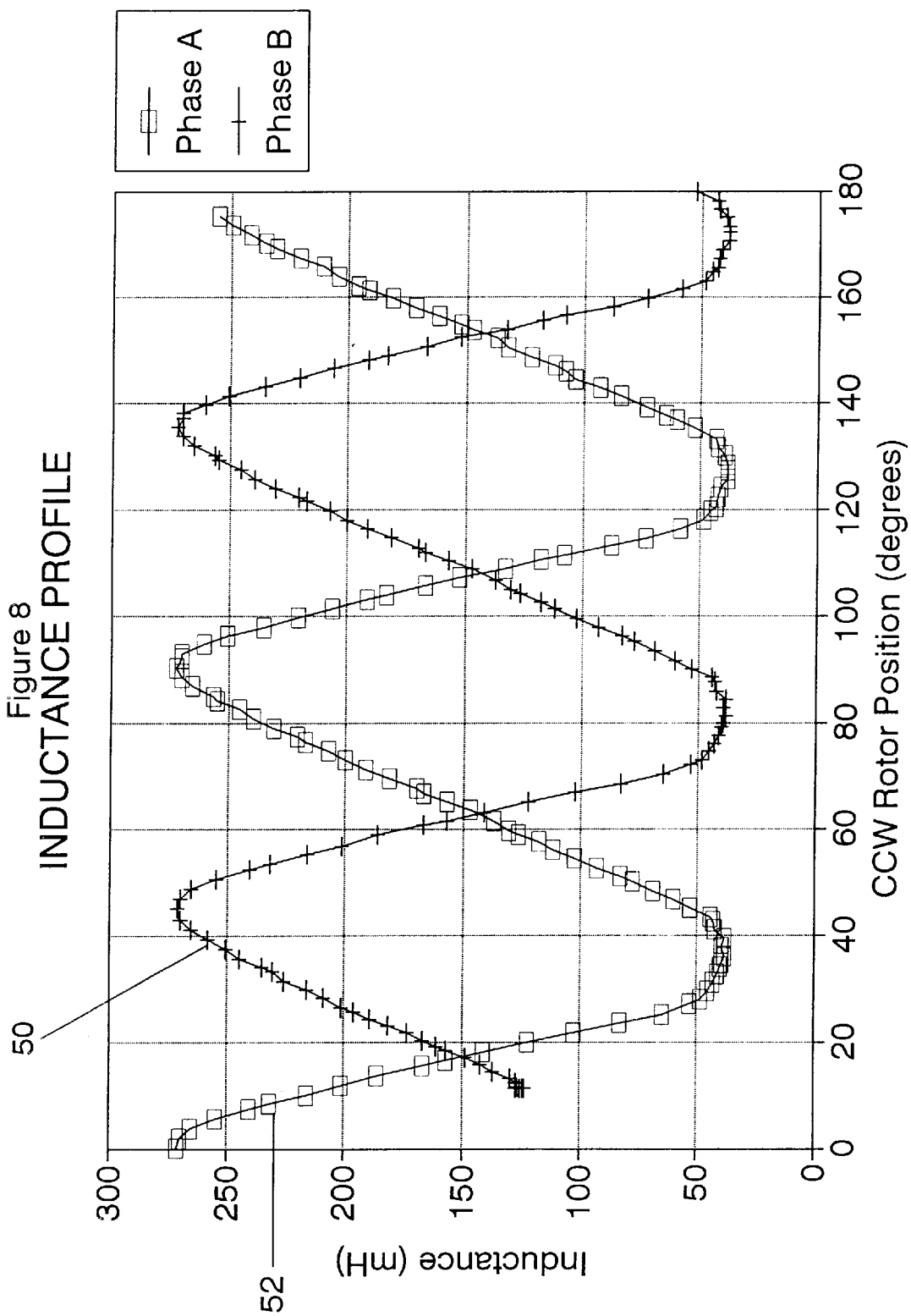

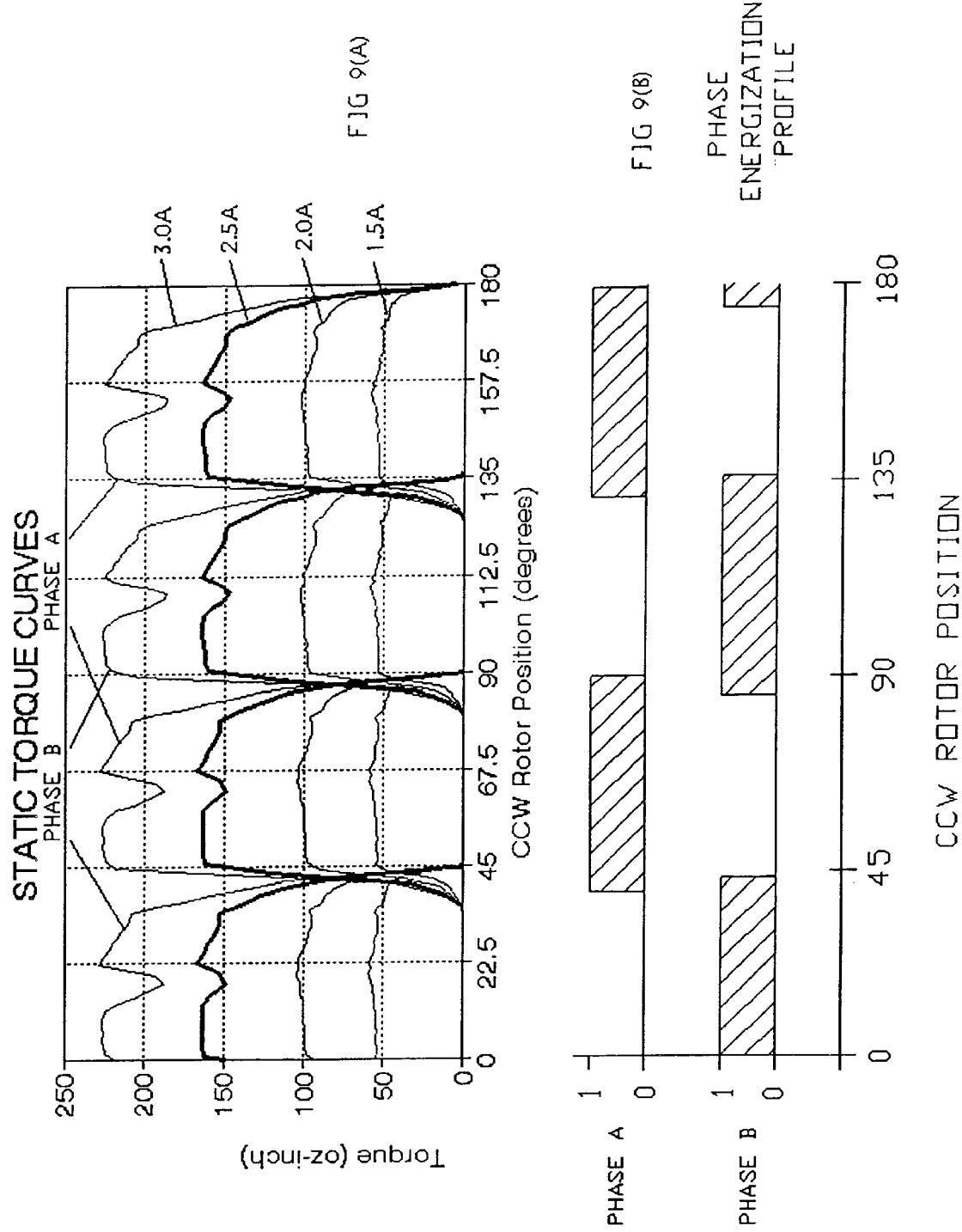

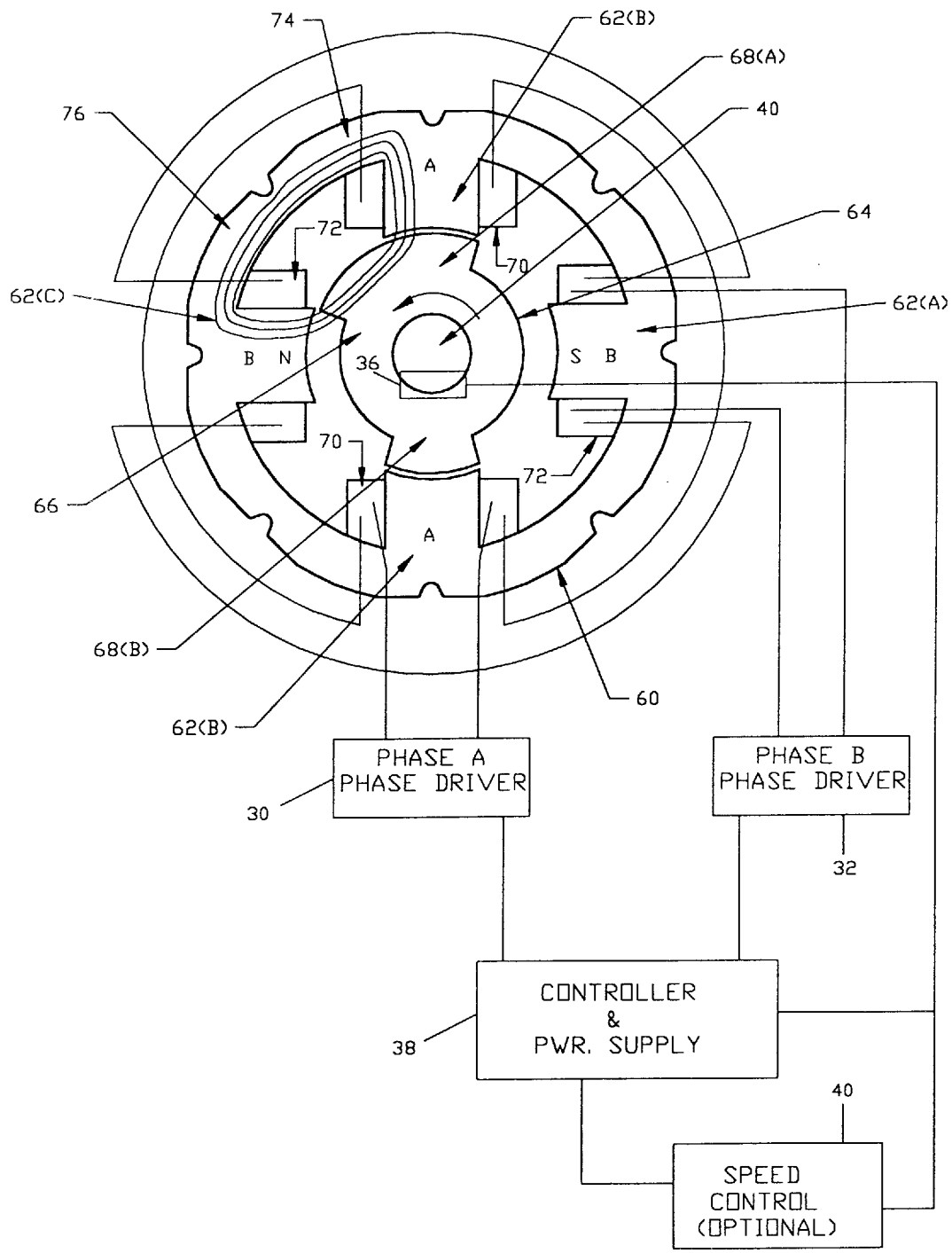

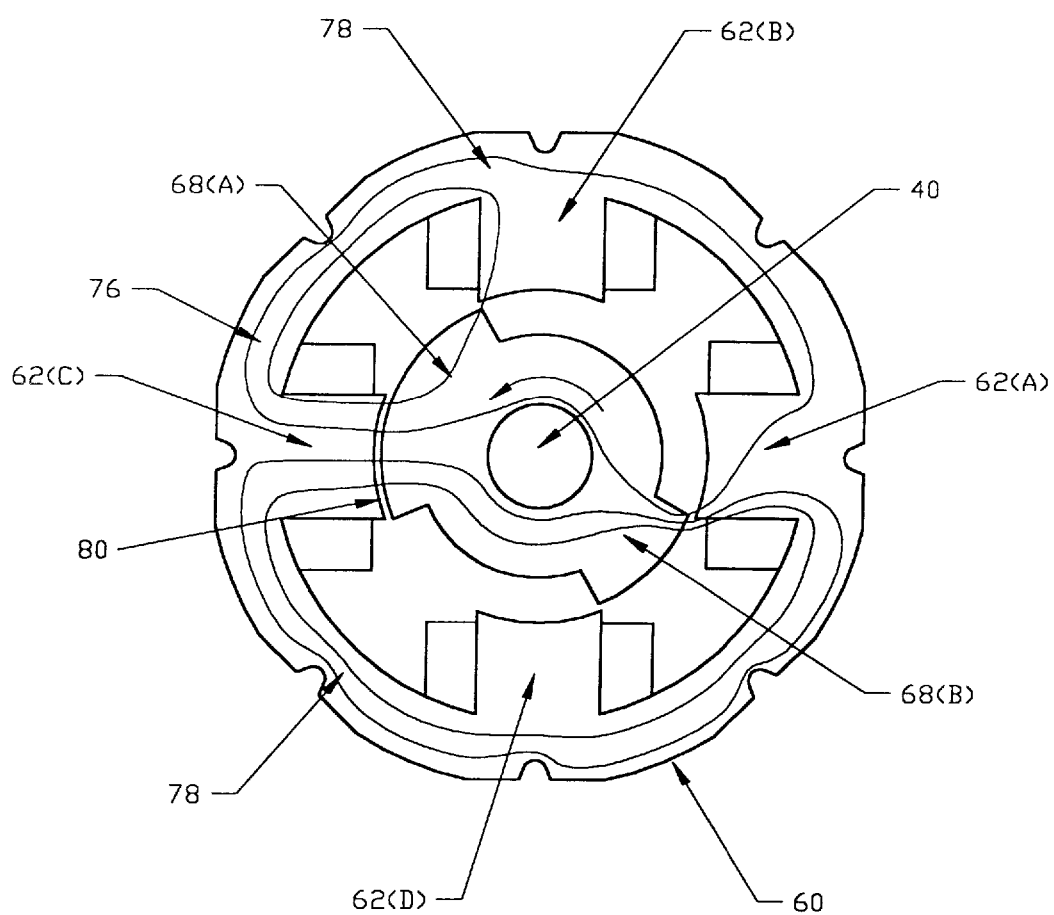

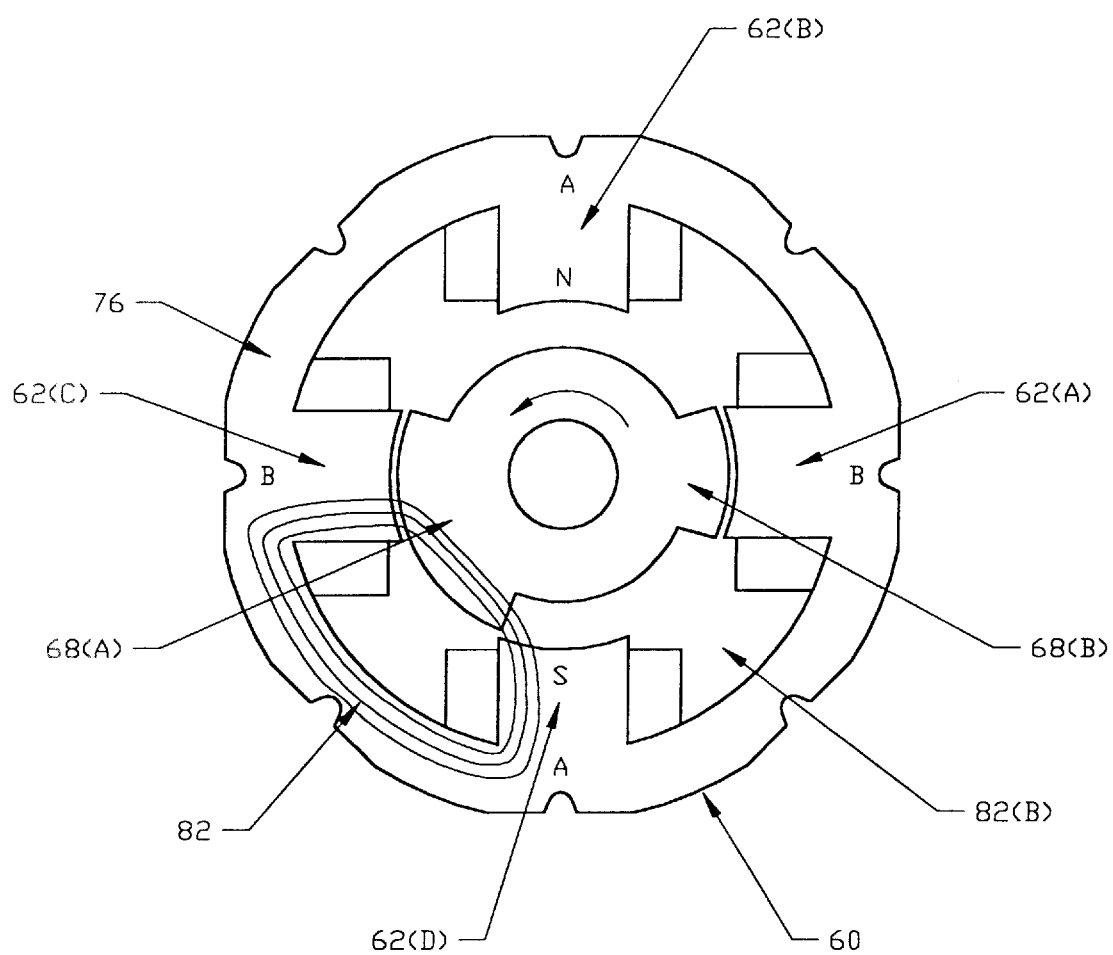

0 DEGREES 22.5 DEGREES

45 DEGREES 67.5 DEGREES

90 DEGREES

STAGGERED POLE SWITCHED RELUCTANCE MOTOR

BACKGROUND OF THE INVENTION

This invention relates to electronically commuted switched reluctance machines and more particularly to continuous rotation motors operated by sources of polyphase electric energy.

Switched reluctance motors are well known in the art. These motors have a stationary member, typically called a stator, and a movable member, typically called a rotor. The rotor and stator are oriented such at they move relative to each other. A typical stator includes a yoke supporting a plurality of magnetically permeable poles circumferentially spaced and having gaps therebetween. A typical rotor includes a magnetically permeable body comprised of laminations of magnetically permeable steel forming two or more poles circumferentially spaced and having gaps therebetween. The rotor is disposed relative to the stator such that their respective poles pass closely adjacent, when the rotor is moved relative to the stator, i.e., the poles of the rotor move in spaced relation to the poles of the stator. The motor has phase windings on the poles of the stator but not on the poles of the rotor. Switched reluctance motors rely on polyphase electronic commutation to excite these phase windings in proper sequence to cause movement of the rotor relative to the stator. Specifically, excitation of the phase windings produces on the stator a pole pair having a north pole and a south pole. These phase windings create a magnetic flux path that passes through the polarized pole pairs, the rotor and the yoke of the stator, i.e., a magnetic circuit. In response to flux passing therethrough, the rotor moves to bring a pair of rotor poles into a minimum reluctance position relative to the polarized pair of stator poles. This minimum reluctance position corresponds to the maximum inductance of the energized phase winding. A feature common to two phase SR motors is that the rotor is typically configured to optimize rotation in one direction. Advantages of switched reluctance motors (hereinafter "SR" motors) are that they are efficient in converting electrical energy into mechanical work, they are reliable because of their mechanical simplicity and they are capable of significant rotational speeds, i.e., 100,000 RPM. Additionally, SR motors are inexpensive to produce, they are rugged and robust and do not require brushes or slip rings.

A number of common SR motor configurations and electronic commutation combinations exist to fulfill certain end use requirements. Some polyphase source and stator/rotor combinations include, without limitation, two phase 8/4 motor; three phase 6/4 motor; four phase 8/6 motor and a five phase 10/8 motor. One reason for increasing the number of stator and rotor poles and for having higher numbers of phases is to increase the number of electronic phase commutations per revolution thereby minimizing torque dips or torque ripple between the phases.

Torque in an SR motor is related to changing inductance (dL) of energized phase windings as a function of rotor position. Inductance in an SR motor decreases or increases as the poles of the rotor move into or out-of alignment with the poles associated with the energized stator windings, i.e., as the rotor-stator system moves into or out-of a minimum reluctance position. Stated differently, torque is produced when there is a change in inductance as a function of angular position, i.e., $dL/d\theta$; positive torque being produced when the inductance of an energized phase increases and negative torque being produced when the inductance of an energized phase decreases.

A problem with prior art two phase SR motors is that at certain angular positions of the rotor relative to the stator, the torque experienced by the rotor is zero or a very small percentage of maximum torque. This position of little or no torque results from the poles of the rotor and the stator being positioned relative to each other such that insufficient flux from an energized stator pole pair passes through a pair of rotor poles to cause relative motion therebetween. Attempts at overcoming this problem included modifying the geometries of the rotor poles such that portions of the rotor pole are in sufficient flux communication with an energized stator pole to impart torque to the rotor.

One such geometry includes a stepped gap rotor wherein a first portion of the face of a rotor pole coming into flux communication with the energizing stator pole forms a gap with the face of the stator pole having a first gap space. The second portion of the face of the rotor pole coming into flux communication with the face of the stator pole forms a second gap that is narrower than the first gap space; the transition between the first gap space and the second gap space being a step.

Another geometry includes a snail-cam design wherein the face of the rotor pole tapers such that the gap between the rotor and the stator becomes progressively smaller as the rotor rotates into minimum reluctance position with respect o the stator. For these pole geometries the faces of the rotor poles are widened such that the first portion of the rotor pole extends towards an adjacent deenergized stator pole when the second portion of the rotor pole is in a minimum reluctance position with an energized stator pole. These various rotor pole geometries eliminate positions of zero torque in a two phase motor, however, such rotor geometries are unable to produce consistent torque throughout the rotation of the rotor. This inconsistent torque, or torque ripple, produced by prior art two phase SR motors is unacceptable for certain applications, such as washing machines, fluid pumps, traction motors, position servos and the like, wherein significant torque may be required at any position of the rotor relative to the stator.

An attempt at overcoming torque ripple in SR motors includes increasing the number of commutation phases to 3 or more. It is well known that torque ripple generally decreases with an increasing number of motor phases. Specifically, 3 phase motors generally have less torque ripple than 2 phase motors, 4 phase motors have less torque ripple than 3 phase motors and so on. The decrease in torque ripple with increasing phases results from the $dL/d\theta$ from one phase being non-zero before the $dL/d\theta$ from an immediately preceding phase becoming zero. Thus, increasing the number of phases to 3 or more produces closely adjoining or overlapping $dL/d\theta$ such that the rotor experiences torque from the energization of one phase before the termination of torque from the energization of another phase. This continuity of torque or overlap in torque between phases of an SR motor results in a more continuous torque having less torque ripple. Problems with SR motors having 3 or more phases, however, are the increased quantity of components for the commutation electronics, and consequently the cost thereof; the increased number of connections between the commutation electronics and the phase windings; the increased resolution of position sensors required to resolve the position of the rotor for the electronic commutation; and more acoustic noise over 2 phase SR motors.

It is the object of the present invention to provide a new and improved SR motor that overcomes the above-referenced problems and others.

SUMMARY OF THE INVENTION

In accordance with one aspect of the present invention, a switched reluctance motor is provided having a stator comprised of a plurality of stator poles and a rotor comprised of a first pole having a pole face of a first size and a second pole having a pole face of a second size. The rotor and stator are disposed relative to each other such that the rotor poles are moveable in spaced relation to the stator poles.

In accordance with another aspect of the invention, the face of each stator pole traverses a first angle and the face of a first rotor pole traverses a second angle wherein the second angle is approximately twice the first angle such that, at the circumference of the rotor, the face of the first rotor pole is approximately twice as wide as the face of the second pole. The face of a second rotor pole traverses approximately the same angle as the face of each stator pole such that the face of the second rotor pole is approximately the same width as the stator poles.

In accordance with another aspect of the present invention, an electric machine powered by a polyphase source is provided. The machine has a first member of magnetically permeable material having a plurality of poles and a second member of magnetically permeable material having a first pole of a first geometry and a second pole of a second geometry. The machine includes a means for mounting said second member for movement relative to said first member such that the poles of the respective first and second members are movable in spaced relation.

In accordance with another aspect of the invention, the pole faces of the first member in opposition with the pole faces of the second member form a substantially constant gap therebetween.

In accordance with another aspect of the invention a switched reluctance motor is provided. The switched reluctance motor includes a two phase source of electrical power, a stator having a yoke and a plurality of poles evenly disposed about the yoke, and a rotor having an even number of poles disposed unevenly thereabout and mounted for rotation about a longitudinal axis and relative to the stator. One of the rotor poles has a pole face of a first size and another of said rotor poles has a pole face of a second size.

In accordance with another aspect of the invention, an angle between a first pole of the rotor and a pole adjacent thereto in a first direction is a first angle and an angle between the first pole and a pole adjacent thereto in a second direction is a second angle.

In accordance with a more limited aspect of the invention, the rotor has four poles and the first angle is greater than 90 degrees and the second angle is less than 90 degrees.

In accordance with another aspect of the invention, an SR motor is provided. The motor includes a stator having a plurality of evenly spaced circumferentially disposed magnetically permeable poles, each pole having a face that traverses a first angle. The motor also has a rotor with an even number of magnetically permeable poles unevenly disposed about a longitudinal axis. The rotor poles include a pole having a narrow face that traverses a first angle and a pole having a wide face that traverses a second angle approximately twice the first angle. The rotor is disposed for rotation about its longitudinal axis and relative to said stator such that the poles of the rotor are moveable in spaced relation to the poles of the stator.

In accordance with a more limited aspect of the invention, the SR motor includes a plurality of windings associated with the poles of the stator for connection to a polyphase source. The energization of the polyphase source causes the windings to energize at least one pair of stator poles to form magnetic poles that impart a torque to the poles of the rotor. In operation, the energization of each phase causes a torque to be imparted onto the rotor wherein for a first part of said phase energization torque is imparted substantially on the wide faced pole and wherein for a second part of said phase energization torque is imparted substantially on the narrow faced pole.

In accordance with yet another aspect of the invention, a method of operating a motor with a polyphase source is provided. The motor is comprised of a first element having a plurality of evenly spaced poles circumferentially arranged in a regular pattern and a second element having an even number of unevenly spaced poles circumferentially arranged in a regular pattern about a longitudinal axis. The second element includes a first pole having a wide pole face and a second pole having a narrow pole face. The first and second elements are disposed such that the respective poles form a gap therebetween. The method comprises energizing a first phase of the polyphase source thereby applying torque to the wide faced pole. With the first phase energized, torque imparted to the wide faced pole is terminated and torque is imparted to narrow faced pole.

In accordance with a more limited aspect of the method, the first phase of the polyphase source is de-energized and a second phase of the polyphase source is energized thereby applying torque to the wide faced pole. With the second phase energized, torque imparted to the wide faced pole pair is terminated and torque is imparted to the narrow faced pole.

In accordance with yet another aspect of the invention a method of operating a generator is provided. The generator is comprised of a first element having a plurality of evenly spaced poles arranged in a regular pattern and a second element having an even number of unevenly spaced poles arranged in a regular pattern. The second element includes a first pole having a wide pole face and a second pole having a narrow pole face. The first and second elements are disposed relative to each other such that the faces of the poles of the first element are movable in spaced relation to the faces of the poles of the second element. The method comprises driving mechanically said first and second elements relative to each other. With the poles of said first and second element generally in alignment a phase winding associated with at least one of the aligned poles is energized. The phase winding is disconnected from the phase driver and connected to an energy storage means for delivering electrical produced by the movement of first and second elements relative to each other thereto.

An advantage of the present invention is the improved torque experienced by the rotor at all positions of the rotor relative to the stator.

Another advantage of the present invention is the improved torque characteristics of a 2 phase SR motor making a two phase SR motor applicable to applications heretofore requiring an SR motor having 3 or more phases.

Still another advantage of the present invention is reduced torque ripple.

Yet another advantage of the present invention is the improved electrical power output over prior art generators.

Still further advantages of the present invention will become apparent to those of ordinary skill in the art upon reading and understanding the following detailed description of the preferred embodiment.

BRIEF DESCRIPTION OF THE DRAWINGS

FIGS. 3–4 are isolated views of the rotor and stator of FIG. 1 showing the rotor advanced by 30 and 45 mechanical degrees respectively relative to the motor of FIG. 1.

FIGS. 5(a)–5(f) are isolated views of the rotor and stator of FIG. 1 showing mechanical progression of the rotor in a CCW direction relative to the stator in response to the generation of north and south pole pairs by the excitation of the phase A and phase B windings, removed for the purpose of illustration.

FIG. 8 is an inductance profile of the phase A and phase B stator windings of FIG. 1 with respect to the CCW progression of the rotor relative to the stator.

FIG. 9(a) is the static torque curves for the Phase A and Phase B windings at 1.5 A, 2.0 A, 2.5 A and 3.0 A phase energization current for the inductance profile of FIG. 8.

FIG. 9(b) is an energization profile of the phase A and phase B stator windings for the static torque curves of FIG. 9(a).

FIG. 11(a) is a sectional views of an 4/2 switched reluctance motor in accordance with the present invention with associated control and operational circuitry connected thereto.

FIGS. 11(b)–(c) are isolated views of the 4/2 switched reluctance motor of FIG. 11(a) showing the rotor advanced by 45 and 90 degrees respectively relative to the motor of FIG. 11(a) in response to the generation of north and south pole pairs by the excitation of the phase A and phase B windings.

DETAILED DESCRIPTION OF THE PREFERRED EMBODIMENT

Figure 1:
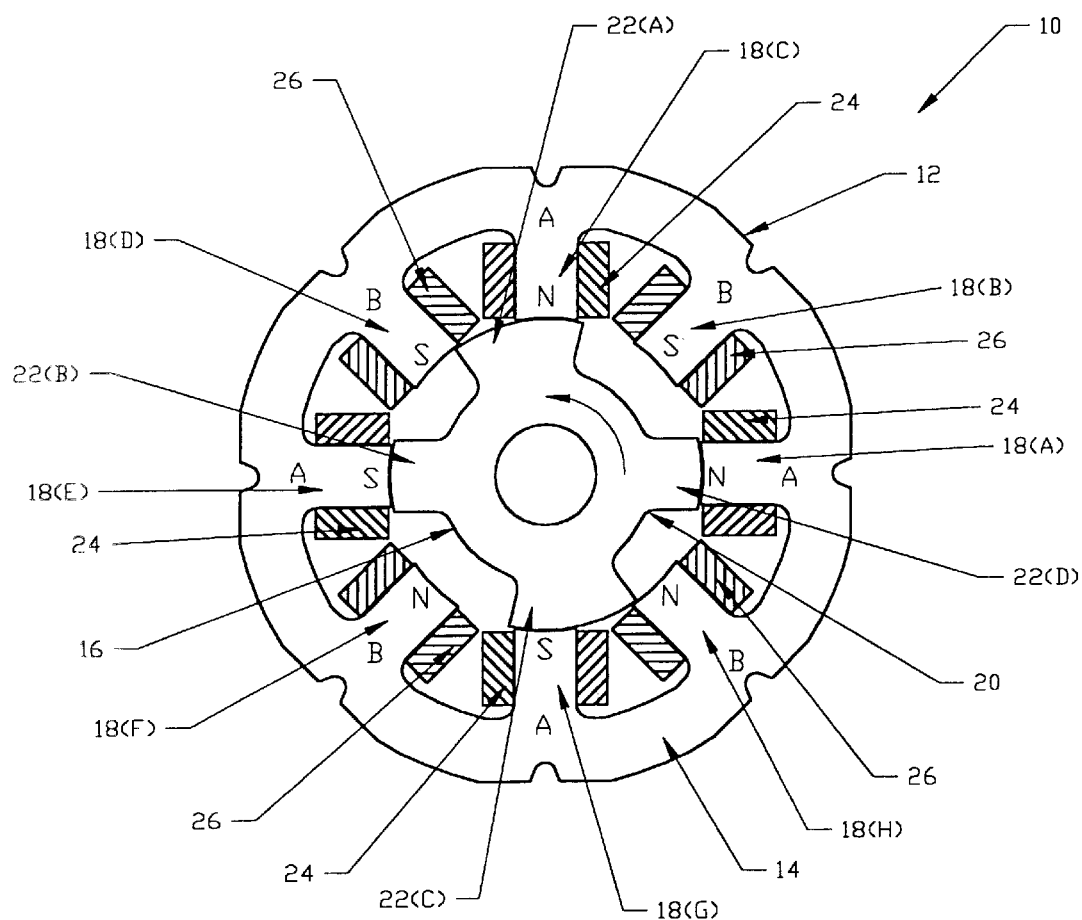
FIG. 1 is a sectional view of an 8/4 switched reluctance motor in accordance with the present invention.

With reference to FIG. 1, a sectional view of a two phase 8/4 switched reluctance motor 10 in accordance with the present invention is illustrated. The motor has a stator 12 having a magnetically permeable member 14 disposed around a central bore 16 and defining a plurality of poles 18(a)–18(h). In the embodiment of FIG. 1 the stator has an even number of poles, and while eight poles are shown in FIG. 1, the stator can have a different even number of poles. A rotor 20 is disposed in the central bore for rotation therein. The rotor has 4 poles 22(a)–22(d), however, the rotor can have a different even number of poles. Phase windings 24, 26 are disposed around the phase A and phase B stator poles respectively for generating magnetic fields that extend from the stator poles into the central bore. Phase windings 24 and 26 are alternately disposed on every other stator pole and are wound such that for every pole of one polarity there is a corresponding pole of an opposite polarity. In the illustrated embodiment, phase A poles 18(a) and 18(c) are north poles and phase A poles 18(e) and 18(g) are south poles. Similarly, phase B poles 18(f) and 18(h) are north poles and phase B poles 18(b) and 18(d) are south poles. It is to be appreciated, that the pole polarity is for illustration purposes only and is not to be construed as limiting the invention.

Figure 2:
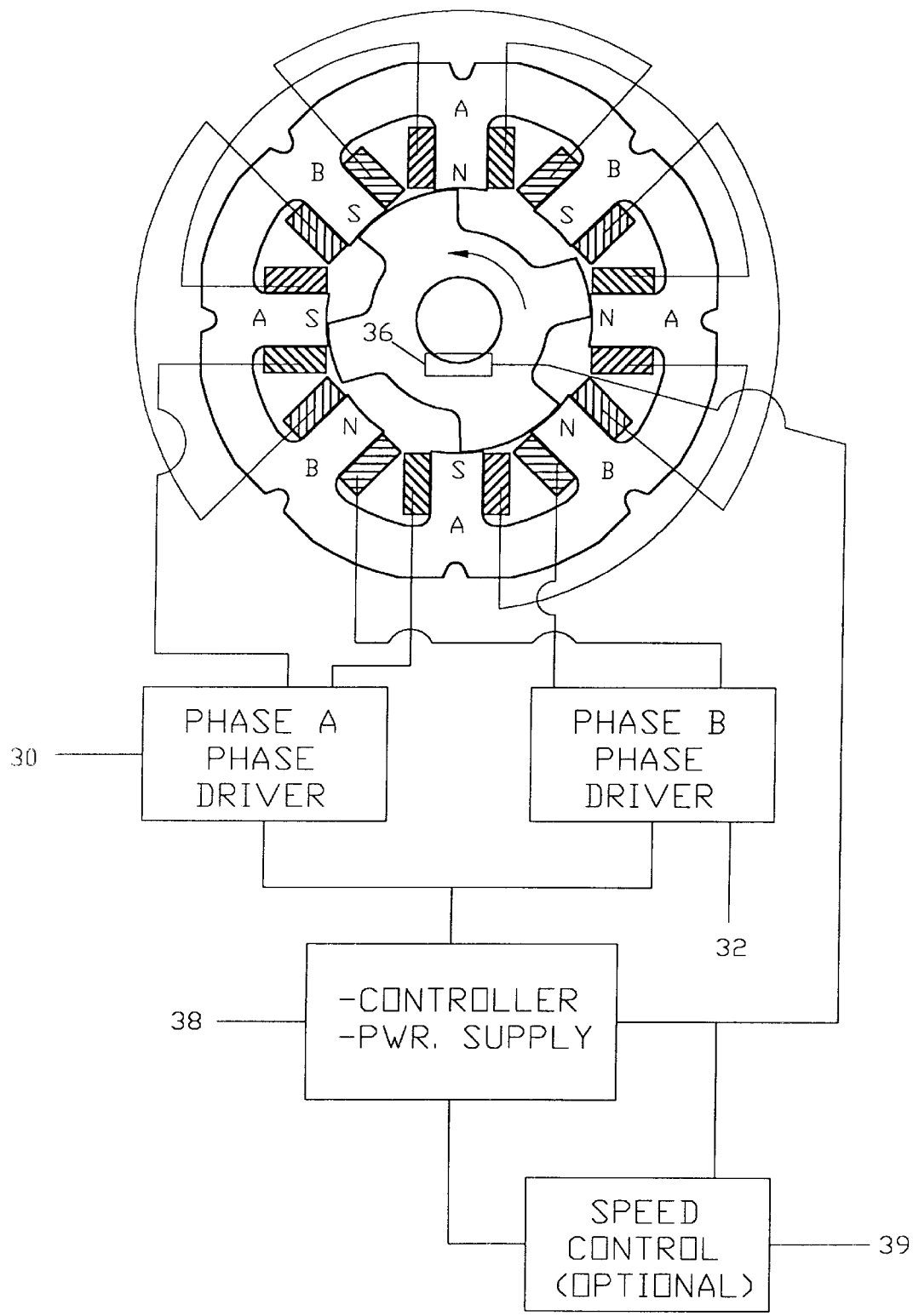
FIG. 2 is the motor of FIG. 1 with associated control and operational circuitry connected thereto and showing the rotor advanced by 15 mechanical degrees relative to the motor of FIG. 1.

With reference to FIG. 2 and continuing reference to FIG. 1, phase windings A and B are series connected to sources of switched current 30 and 32 respectively such that current flows through the phase windings only in one direction. It is to be appreciated, however, that the phase windings could be parallel connected or combination series-parallel connected to their respective sources of switched current. A position sensor 36, such as a hall effect sensor, a resolver or an encoder, is connected between the rotor and the stator for determining the position of the rotor relative to the stator. Alternatively, self inductance of the phase windings are used to determine the position of the stator relative to the rotor. The position sensor has an output connected to a controller 38 for reporting the angular position of the rotor relative to the stator. The controller 38 is connected to the phase A and phase B phase drivers for controlling the firing of the respective phases in accordance with the position of the rotor relative to the stator. An optional speed control 39 connected to controller 38 provides for adjustment of the rotational speed of the rotor. In the FIG. 2 embodiment, motor 10 is a unidirectional motor in which the rotor rotates counterclockwise (CCW) with respect to the stator. It is to be appreciated, however, that motor could be designed for clockwise (CW) rotation and that the direction of rotation is not to be construed as limiting the invention.

Figure 3:
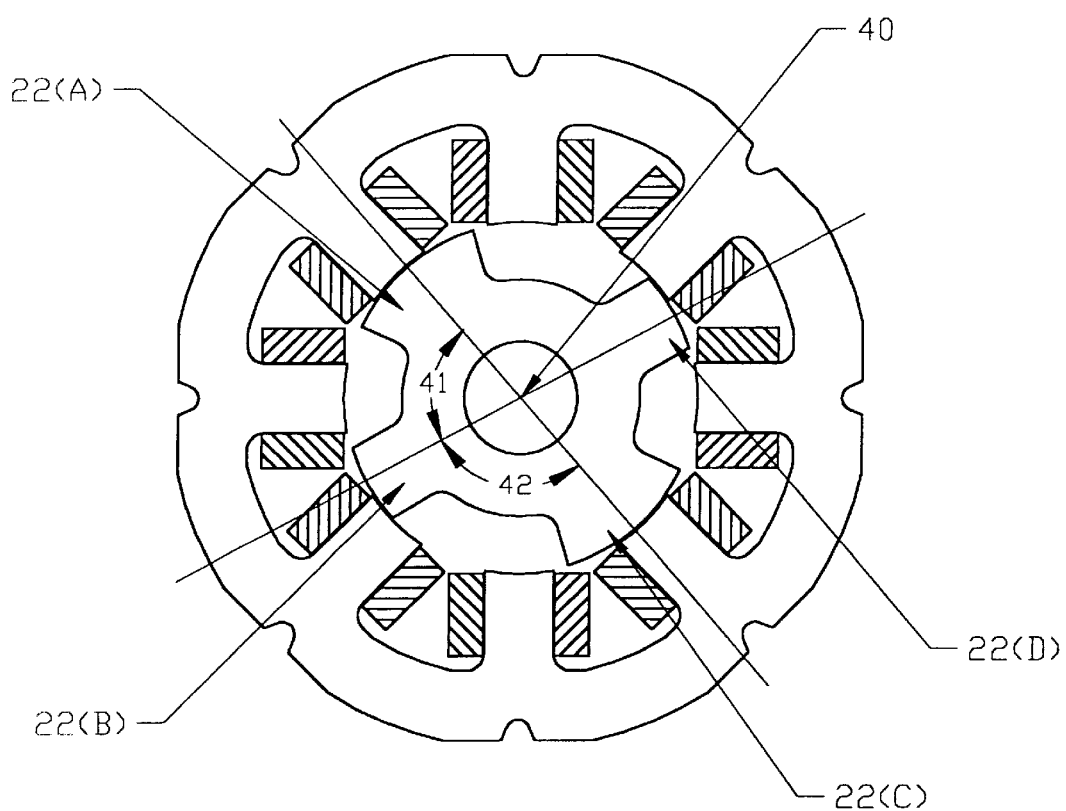

With reference to FIG. 3, the poles of the rotor are disposed unevenly about the circumference thereof. With reference to a longitudinal axis 40 of the rotor, the angle between rotor poles 22(a)–(b) and 22(c)–(d) is a first angle 41, and the angle between rotor poles 22(b)–(c) and 22(a)–(d) is a second angle 42, greater than the first angle. Moreover, as shown in FIG. 4, the faces of the wide rotor poles span a third angle 43 and the faces of the narrow rotor poles span a forth angle 44 less; the third angle being greater than the forth angle. In the preferred embodiment, at the circumference of the rotor, the face of the wide rotor poles are twice as wide as the face of the narrow rotor poles. At the inside circumference of the stator the face of the stator poles are approximately the same width as the face of the narrow rotor poles and the distance between adjacent stator poles is approximately the width of a stator pole.

Figure 5C:
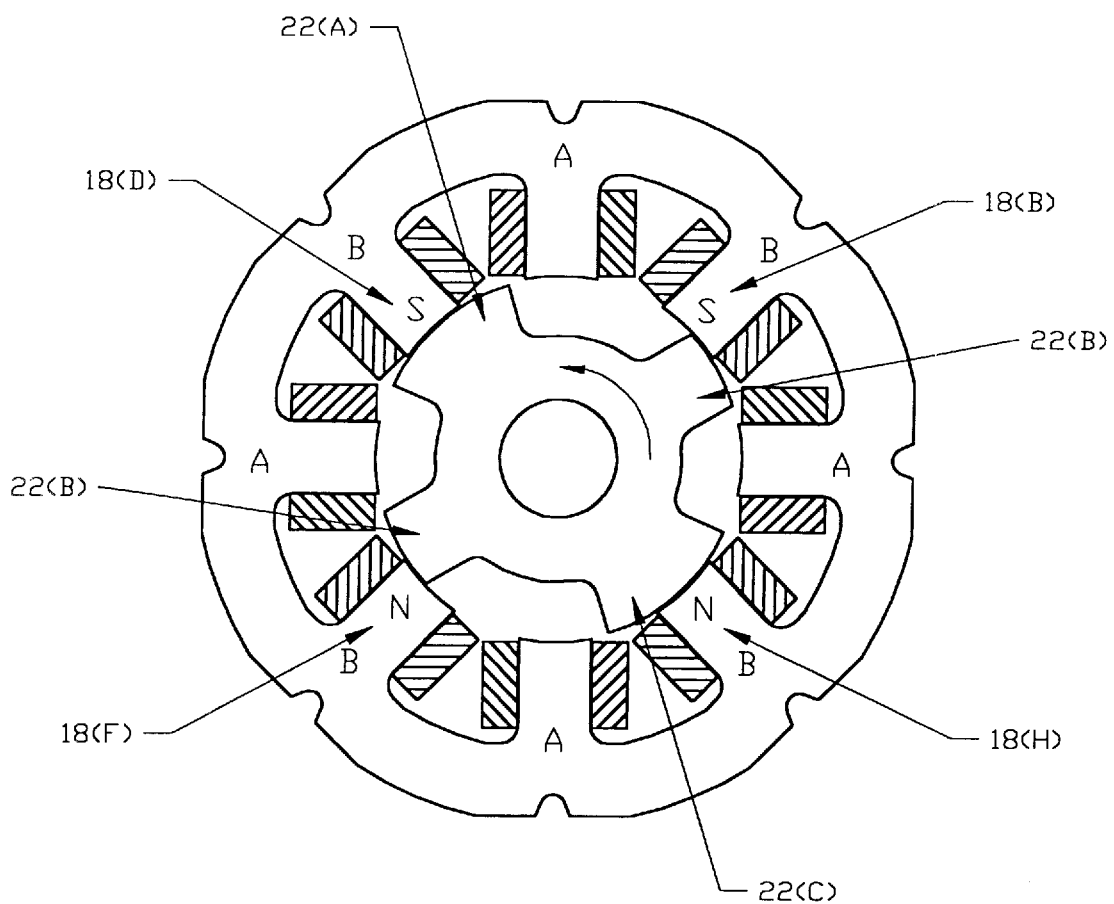
Figure 5D:
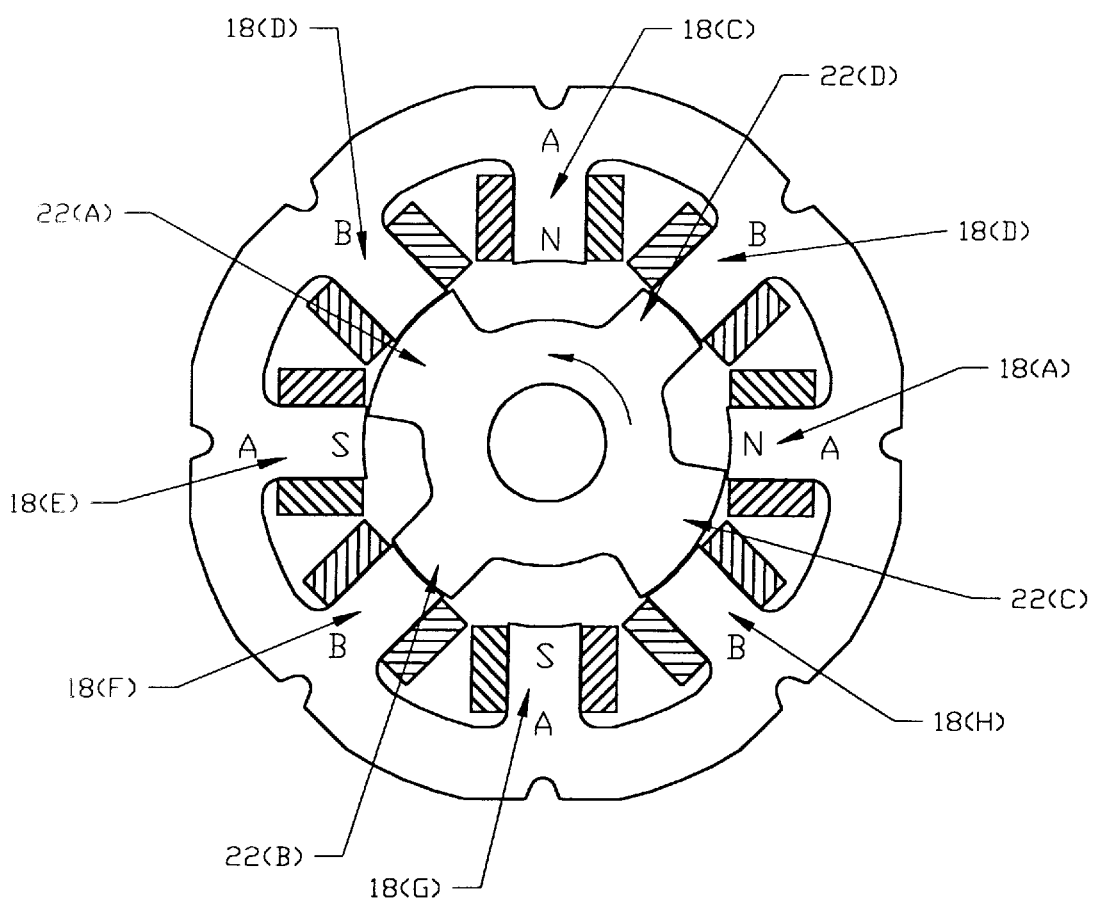
Figure 5E:
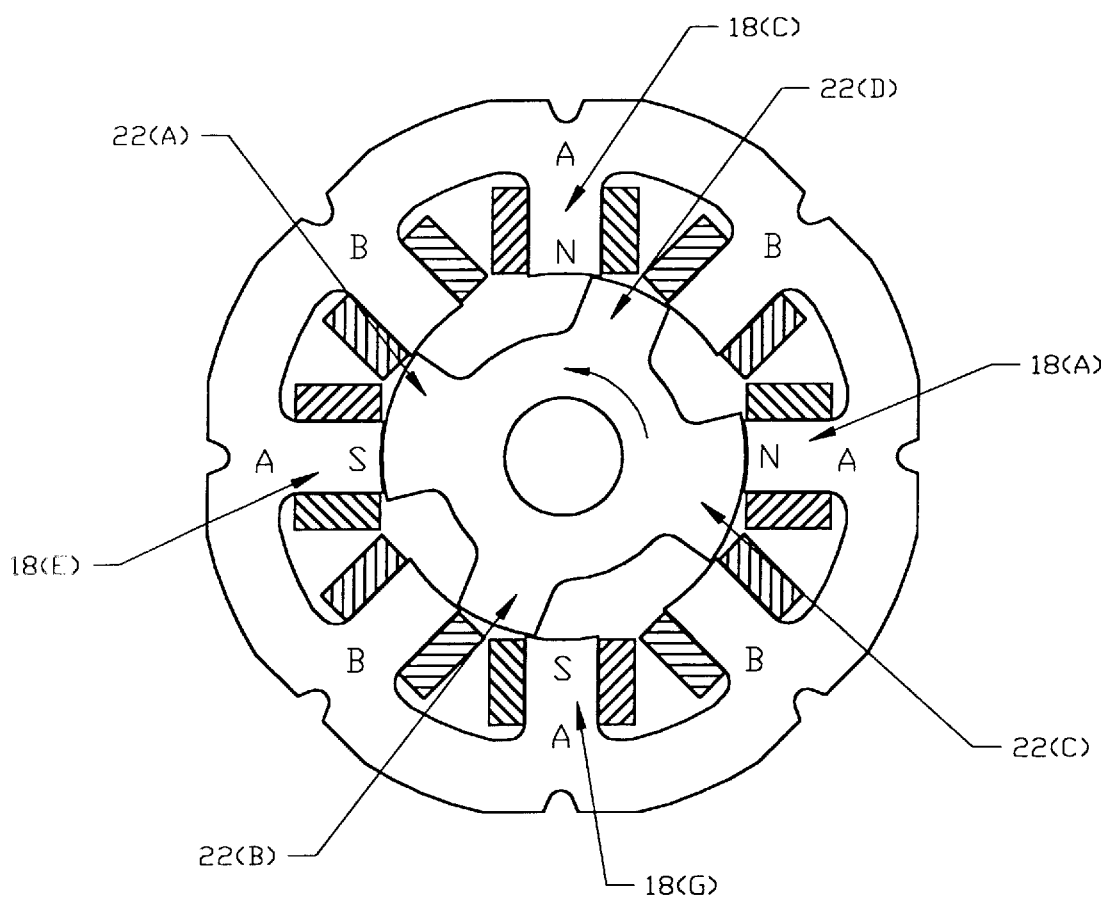
Figure 5F:
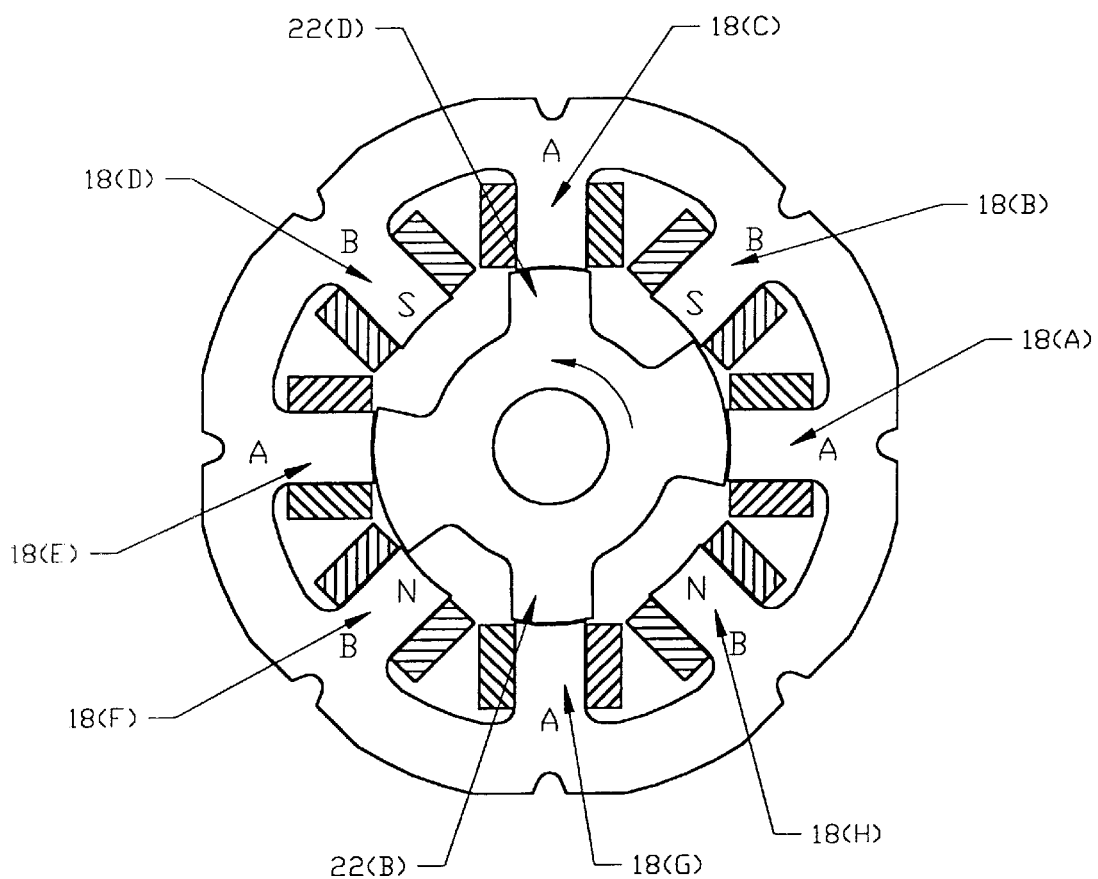

With reference to FIGS. 5(a)–5(f), the CCW progression of the rotor with respect to the stator, in response to the generation of north-south pole pairs by the excitation of associated phase windings, is illustrated. In FIGS. 5(a)–5(f) the phase windings, the phase A and phase B drivers, the controller/power supply, the speed control and the position sensor of FIGS. 1 and 2 have been omitted to facilitate uncluttered views of the rotor and stator. To facilitate an understanding of when the omitted phase windings of FIGS. 5(a)–5(f) are energized, the poles associated with an excited phase are marked with either an 'N' or an 'S' to signify a north or south pole respectively. In operation, starting from the zero degree CCW rotor position of FIG. 5(a), the controller 38 causes the phase B current source 32 to energize the phase B windings in the absence of excitation of the phase A windings. This excitation produces a CCW torque on the rotor causing the rotor to align the wide rotor poles with excited phase B stator poles 18(d) and 18(h), i.e., the rotor poles move into minimum reluctance position with respect to the phase B poles—the minimum reluctance position corresponding to the maximum inductance of the energized phase windings producing said alignment. In FIG. 5(b), at 22.5 degrees CCW rotor position, the wide rotor poles and adjacent energized phase B stator poles are in a minimum reluctance position with respect to each other as a result of a constant gap being formed therebetween. However, the inductance of the phase B windings increases due to the narrow rotor poles 22(b) and 22(d) moving to a minimum reluctance position with stator poles 18(b) and 18(f). Accordingly, the rotor experiences a torque due to the interaction of the narrow rotor poles with the energized phase B windings while experiencing little or no torque from the interaction of the wide rotor poles with the energized phase B windings. In this manner, torque experienced by the rotor shifts from the wide rotor poles to the narrow rotor poles. In FIG. 5(c), at 30 degrees CCW rotor position, the rotor experiences CCW torque from the energized phase B windings in cooperation with the increasing inductance thereof caused by the narrow rotor poles moving to a minimum reluctance position with phase B stator poles 18(b) and 18(f). It is to be appreciated that between 22.5 and 45 degrees rotor position the gap, and therefore the reluctance, between the wide rotor poles and stator poles 18(d) and 18(h) is substantially constant and therefore the rotor experiences no torque from interaction of the energized phase B windings and wide rotor poles. In FIG. 5(d), at 45 degrees CCW rotor position, the wide and narrow rotor poles are in minimum reluctance position with energized phase B stator poles 18(d)–18(h) and 18(b)–18(f) respectively. Accordingly, at this position no torque is imparted to the rotor from the energization of the phase B windings. Energizing the phase A windings at 45 degrees CCW rotor position, however, causes flux to flow from phase A poles 18(a) and 18(e) through the wide rotor poles. In response to flux flowing therethrough, the rotor experiences a CCW torque causing the rotor to align the wide poles with the poles of the excited phase A windings. As the rotor moves past 45 degrees CCW rotor position, however, the energized phase B windings experience a decrease in inductance due to the increasing reluctance between the stator poles of the phase B windings and the rotor poles. To avoid having the rotor experience a CW (negative) torque from energization of the phase B windings in cooperation with the decreasing inductance thereof, the phase B windings are deenergized. In this manner, the torque experienced by the rotor shifts from the phase B windings to the phase A windings. In FIG. 5(e), at 67.5 degrees of CCW rotor rotation, the wide rotor poles and energized phase A stator poles 18(a) and 18(e) are in a minimum reluctance position such that no torque is imparted to the rotor from the interaction thereof. The inductance of the energized phase A windings, however, is increasing due to the narrow rotor poles coming into flux communication with energized phase A stator poles 18(c) and 18(g). Thus, torque imparted to the rotor from the energized phase windings shifts from the wide rotor poles to the narrow rotor poles. In FIG. 5(f), at 90 degrees of CCW rotor rotation, the wide and narrow rotor poles are in minimum reluctance alignment with stator poles 18(a)–18(e) and 18(c)–18(g) respectively. Accordingly, the rotor experiences no torque from the interaction of the wide rotor poles with the phase A windings. Energizing the phase B windings, however, causes flux to flow from phase B poles 18(b) and 18(f) through the wide rotor poles. In response to the energization of the phase B windings, the rotor experiences a CCW torque causing the rotor to align the wide poles with the excited phase B windings. To avoid having the rotor experience a CW (negative) torque from energization of the phase A windings in cooperation with the decreasing inductance thereof, the phase A windings are deenergized.

Figure 6A:
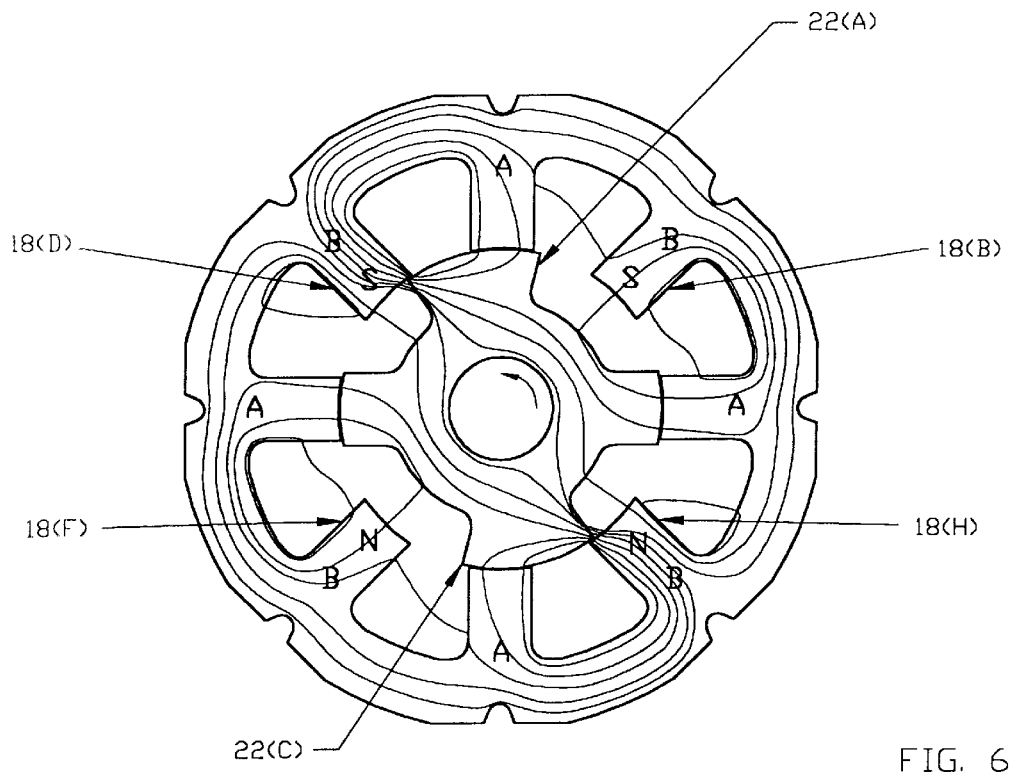
FIGS. 6(a)–6(f) are flux plots corresponding to the phase energization and rotor and stator positions of FIGS. 5(a)–5(f)
Figure 6B:
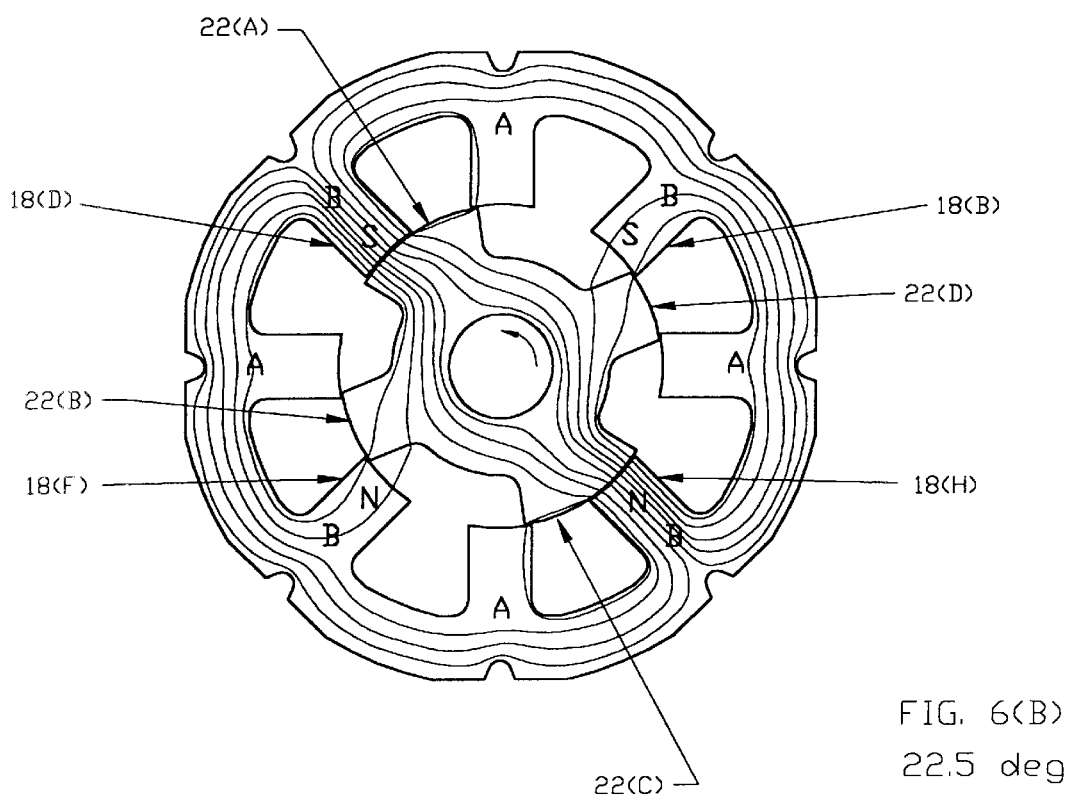
Figure 6C:
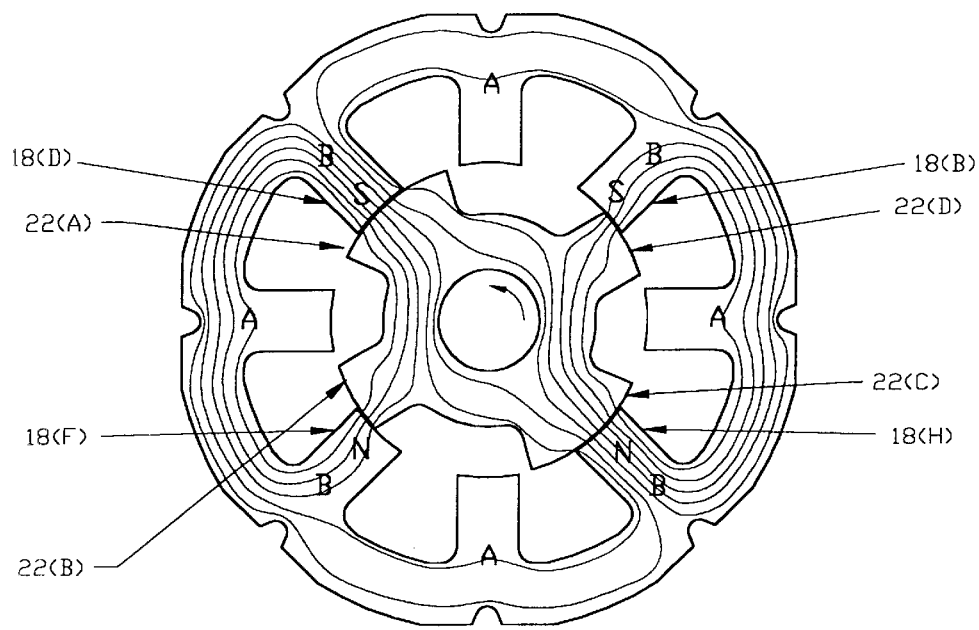
Figure 6D:
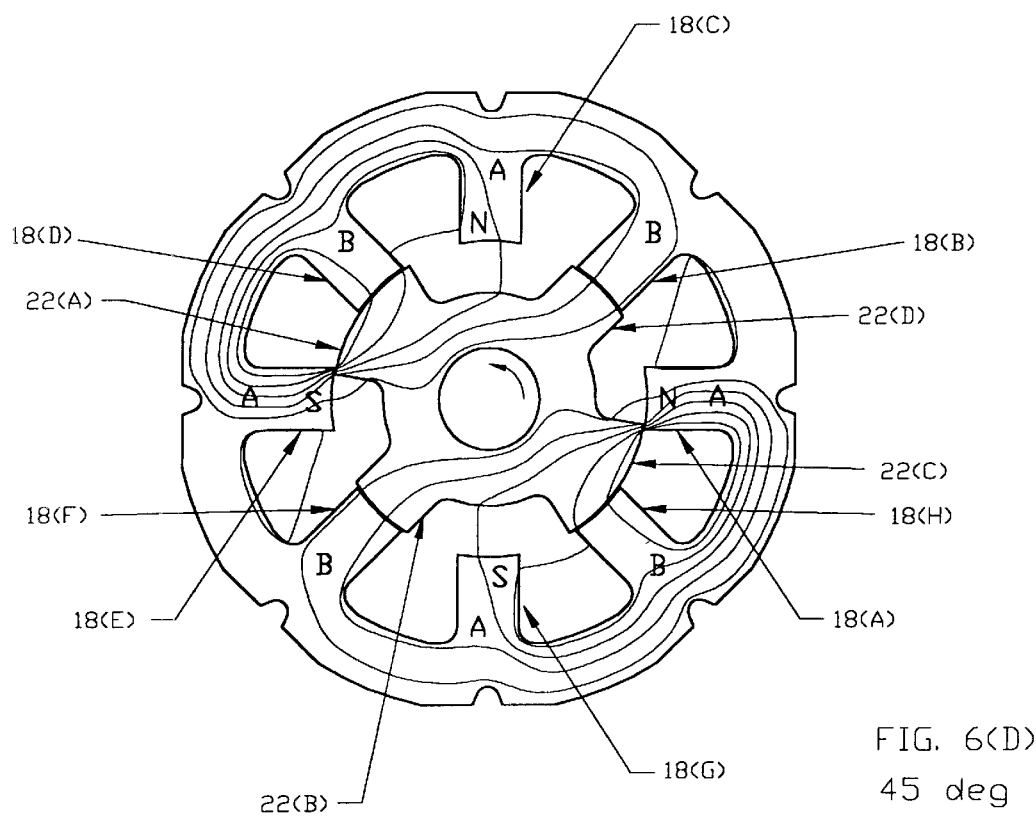
Figure 6E:
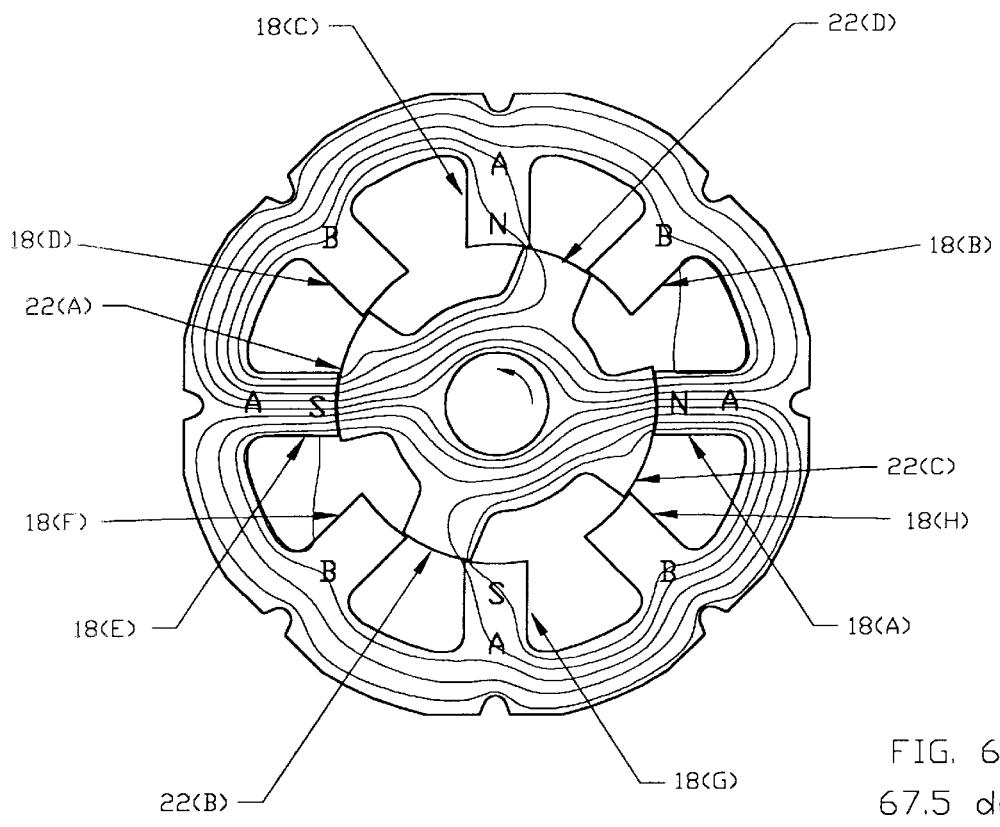
Figure 6F:
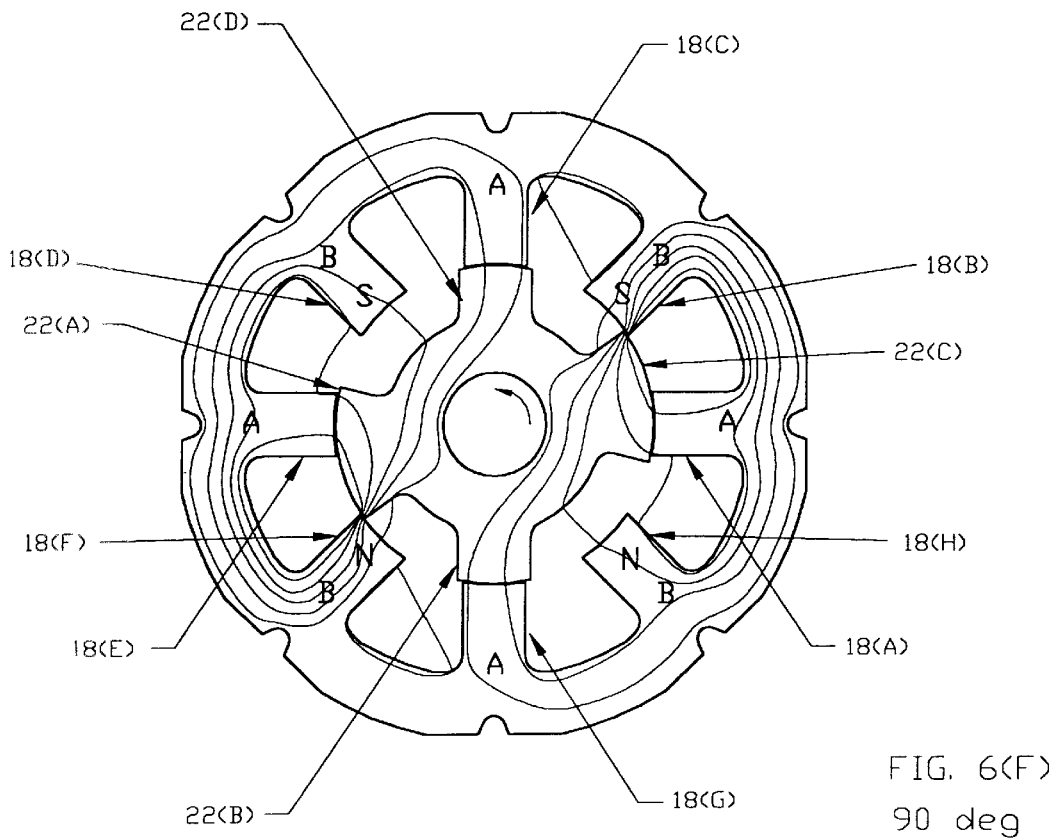

With reference to FIGS. 6(a)–6(f), magnetic flux plots corresponding to the rotor positions and phase energizations of FIGS. 5(a)–5(f) are illustrated. In FIGS. 6(a)–(b), between 0 and 22.5 degrees CCW rotor position a greater amount of flux flows through the wide rotor poles than through the narrow rotor poles. Referring to FIGS. 6(b)–(c), between 22.5 and 30 degrees CCW rotor position the amount of flux passing through the narrow rotor poles increases as the narrow rotor poles move into minimum reluctance position with stator poles 18(b) and 18(f). With reference to FIG. 6(d), at 45 degrees rotor position, the phase B windings are deenergized and the phase A windings are energized such that flux flowing through the rotor shifts from the phase B windings to the phase A windings. With reference to FIGS. 6(d)–(e), flux produced by the energization of the phase A windings between 45 and 67.5 degrees rotor position initially passes through the wide rotor poles and increases through the narrow rotor poles as the narrow poles move into minimum reluctance position with stator poles 18(c) and 18(g). With reference to FIG. 6(f), at 90 degrees rotor position, the phase A windings are deenergized and the phase B windings are energized.

In the foregoing description the rotor is advanced through 90 mechanical degrees by the selective energization and deenergization of the phase A and phase B windings in relation to the position of the rotor relative to the stator. It is to be appreciated, however, that the above description is extendable to movement of the rotor beyond 90 mechanical degrees. Moreover, it is to be appreciated that the increasing or decreasing inductance of a phase winding corresponds to the respective decreasing or increasing reluctance in the magnetic flux path associated with said phase winding.

Figure 7A:
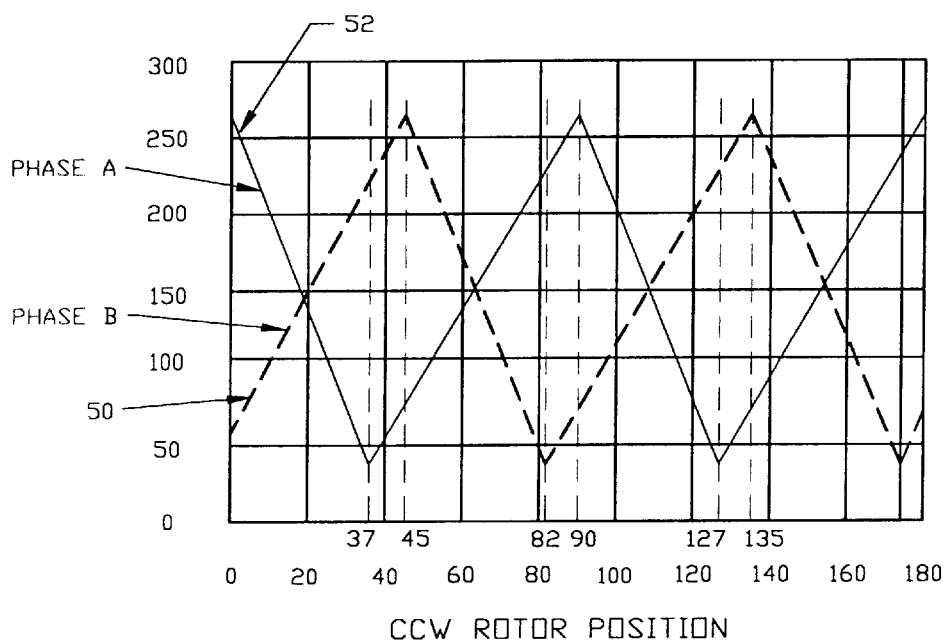
FIG. 7(a) is an exemplary ideal inductance profile of the phase A and phase B stator windings of FIG. 1 with respect to the CCW mechanical progression of the rotor relative to the stator.
Figure 7B:
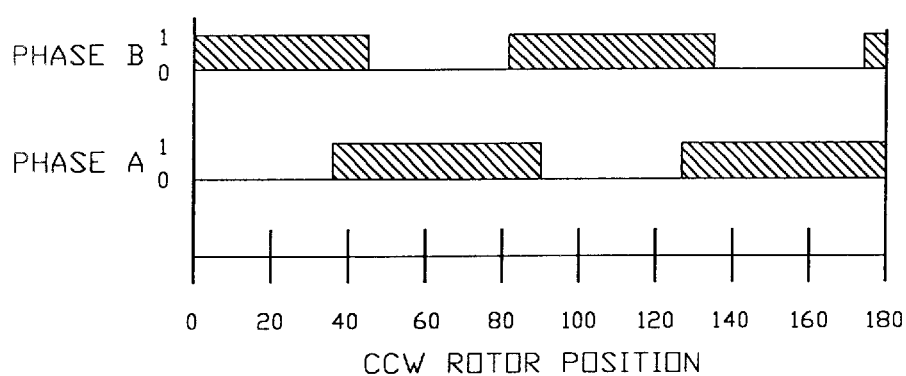
FIG. 7(b) is an ideal energization profile of the phase A and phase B windings of FIG. 1 for the inductance profile of FIG. 7(a).

The present invention produces in the phase A and phase B windings a change in inductance with angular position (dL/dθ) having a slope that increases at a first rate and decreases at a second rate. Specifically, with reference to FIGS. 7(a)–(b), and continuing reference to FIGS. 5(a)–(f), an exemplary ideal inductance profile for the change in inductance of the phase B windings 50 and the phase A windings 52 as a function of the CCW position of the rotor and in relation to ideal energization of the phase A and phase B windings is illustrated. It is to be appreciated that the FIGS. 7(a)–(b), are for illustration purposes and are not to be construed as limiting the invention. At 0 degree rotor position, the phase B windings are energized in the absence of the energization of the phase A windings. In response, the rotor experiences a CCW torque that urges the rotor and stator combination towards a minimum reluctance, maximum inductance, position. Concurrent with the increasing inductance of the phase B windings the inductance of phase A windings is decreasing. As illustrated in FIG. 7(*a*), the inductance of each phase of the novel pole configuration decreases more rapidly than it increases. This allows for advantageous overlap of the increasing inductance of the phase A and phase B windings. Specifically, at 37 degrees rotor position, the inductance of phase A windings transitions from decreasing to increasing and the phase A windings are energized. Between 37 degrees and 45 degrees rotor position, both phase windings are energized and the inductance of both phase windings are increasing. Accordingly, the rotor experiences torque from both the phase A and phase B windings. At 45 degrees rotation, and with the phase A windings energized, the phase B inductance transitions from increasing to decreasing and the phase B windings are deenergized. In this manner, the rotor experiences a positive CCW torque from the energization of the phase A windings in cooperation with the increase in inductance thereof while avoiding a negative CW torque from the energization of the phase B windings in cooperation with the decrease in inductance thereof. At 82 degrees of rotation, the inductance of the phase B windings transitions from decreasing to increasing and the phase B windings are energized. Between 82 and 90 degrees of rotation the increasing inductance of the phase A and phase B windings in cooperation with the energization thereof imparts a torque to the rotor. At 90 degrees of rotation, the inductance of the phase A windings transitions from increasing to decreasing and the phase A windings are deenergized such that torque is imparted onto the rotor exclusively from the increasing inductance of phase B in cooperation with the energization thereof. At 127 degrees rotation, the inductance of phase A transitions from decreasing to increasing and the phase A windings are energized. Accordingly, between 127 and 135 degrees rotor position the phase A and phase B windings impart a torque to the rotor. At 135 degrees rotation, the inductance of the phase B windings transitions from increasing to decreasing and the phase B windings are deenergized such that the torque imparted onto the rotor is exclusively from the increasing inductance of phase A in cooperation with the energization thereof.

From the foregoing, it should be appreciated that the present invention produces in the phase A and phase B windings a change in inductance as a function of rotor position wherein the inductance of a phase winding increases at a different rate than the inductance thereof decreases. Specifically, the increasing inductance of each phase extends over a greater angular position than the decreasing inductance thereof. By way of example and not of limitation, with reference to FIG. 7(*a*), the phase B inductance decreases between 45 and 82 degrees rotor position, i.e., over 37 mechanical degrees, and increases between 82 and 135 degrees rotor position, i.e., over 53 mechanical degrees. Similarly, the phase A inductance increases between 37 and 90 degrees rotation, i.e., over 53 mechanical degrees, and decreases between 90 and 127 degrees rotation, i.e., over 37 mechanical degrees. The differing slopes of increasing and decreasing inductance of the phase A and phase B windings allows for the advantageous overlap thereof as illustrated in FIG. 7(*a*) and described above. This overlap of increasing inductance in cooperation with the selective energization of the phase A and phase B windings provides for torque to be imparted onto the rotor at all positions of the rotor relative to the stator.

With reference to FIG. 8, and continuing reference to FIGS. 7(*a*)–(*b*), an inductance profile of the embodiment illustrated in FIGS. 5(*a*)–(*f*) is illustrated. In contrast to the ideal inductance profile of FIGS. 7(*a*)–(*b*), the inductance profile of FIG. 8 illustrates that the transition between increasing and decreasing inductance of the phase A and phase B windings occurs gradually as the rotor poles move into and out-of alignment with the stator poles. Because positive, CCW, torque on the rotor is a function of increasing inductance of an energized phase winding, it is desirable to coordinate the energization of the phase windings with the rotor position to ensure the phase windings are experiencing an increasing inductance when energized. Thus, by way of example and not of limitation, with reference to FIG. 8, at 0 degrees rotor position the phase B windings are energized and the phase A windings are deenergized. Between 40 and 44 degrees rotor position the phase A windings are energized and the phase B windings are deenergized in a manner that results in minimal torque ripple being experienced by the rotor as the torque imparted to the rotor transitions from the phase B windings to the phase A windings. Similarly, between 85 and 89 degrees of rotor position, the phase A windings are deenergized and the phase B windings are energized in a manner that results in minimal torque ripple being experienced by the rotor. It is to be appreciated, however, that the inductance of the respective phases prevent instantaneous energization and deenergization thereof. Accordingly, in practice, the energization and deenergization of the respective phases is timed to occur such that the torque experienced by the rotor is optimized. Thus, by way of example and not by way of limitation, at approximately 40 degrees of rotor rotation the phase B windings are deenergized such that the energy stored therein is dissipated in advance of the phase B windings experiencing a decreasing inductance thereby imparting a negative CW torque onto the rotor. Similarly, at approximately 40 degrees of rotor rotation the phase A windings are energized thereby imparting a positive CCW torque onto the rotor. Because of the advantageous overlap of increasing inductance of the phase A and phase B windings, the energization of the respective windings can be timed to optimize the torque experienced by the rotor. Under ideal conditions the rotor experiences a relatively constant torque with rotor position. In practice, however, the rotor experiences some torque dip as the torque imparted thereon transitions between the respective phase windings.

It is believed that the width of the rotor poles affect the inductance profile of FIG. 8. Specifically, with reference to FIG. 4, the face of the narrow poles, 22(*b*) and 22(*d*) are approximately the same width as the face of the stator poles while the face of the wide rotor poles, 22(*a*) and 22(*c*), are illustrated as being approximately the same width as the combined width of the face of a stator pole and an adjacent space, e.g., stator pole 22(*a*) and space 52. This arrangement advantageously provides for the aforementioned overlap of increasing inductance of the phase windings. It is believed, however, that the overlap of the phase A and phase B inductance profiles are adjustable by modifying the width of rotor poles. For example, narrowing the wide and narrow rotor poles results in an inductance profile wherein there is little or no overlap of increasing inductance as the torque on the rotor transitions between the wide rotor poles and the narrow rotor poles. Similarly, widening the wide and narrow rotor poles increases the overlap of the increasing inductance of the respective phase A and phase B windings. It is believed, however, that the widening or narrowing of the width of the rotor poles excessively will result in undesirable torque dips. Moreover, widening one of the wide or narrow rotor poles and narrowing the other rotor poles will result in variations in the overlap of increasing inductance. In like manner, it is also believed that modifying the width of the stator poles also affects the overlap of the phase A and phase B inductance profiles.

Figure 9C:
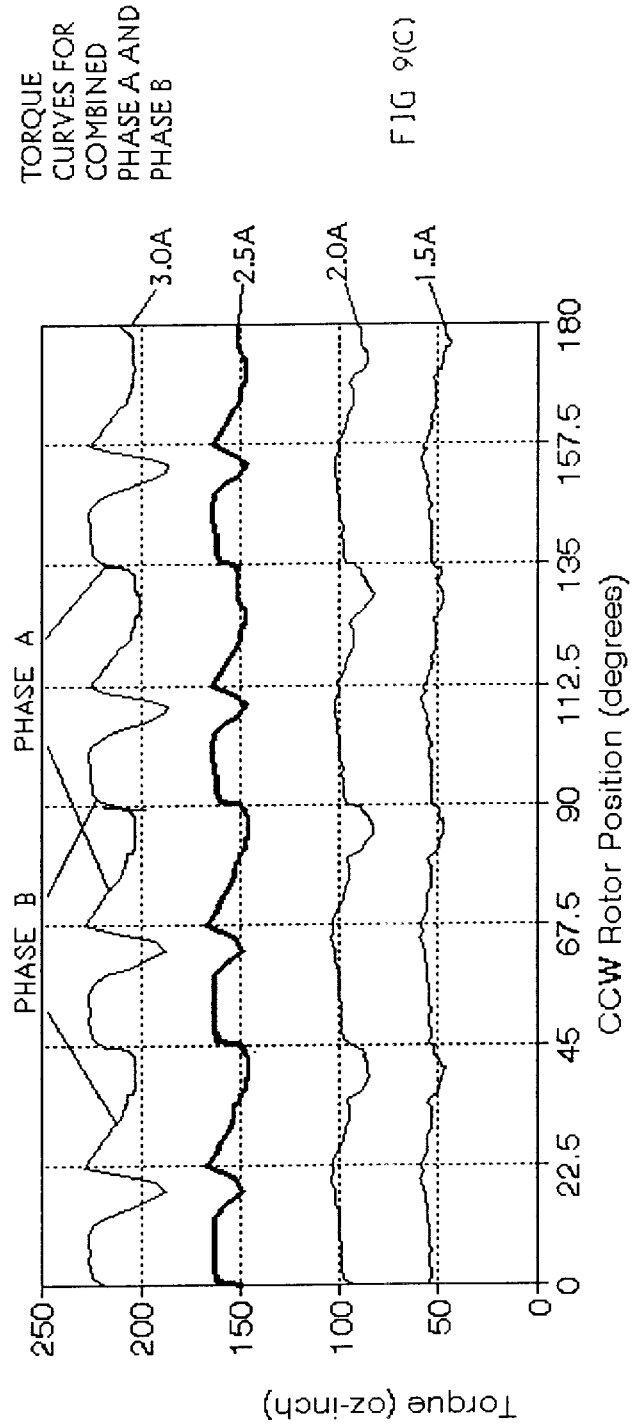
FIG. 9(c) is the torque curves resulting from the combination of the Phase A and Phase B torque curves of FIG. 9(a).

With reference to FIGS. 9(a)–(b), torque curves for the embodiment shown in FIGS. 5(a)–5(f), at different phase winding energization currents, i.e., 1.5 A, 2.0 A, 2.5 A and 3.0 A, are illustrated in relation to the phase energization profile thereof. These torque curves illustrate the torque imparted to the rotor from the energization of the respective phase windings and the advantageous overlap thereof. It is to be appreciated that the torque experienced by the rotor is the sum of the torque produced by the energization of the respective phase A and phase B windings. Thus, as shown in FIG. 9(c), when phases A and B are both energized, e.g., between 40 and 45 degrees rotor position, the torque experienced by the rotor is the sum of the torque imparted to the rotor from the energization of the respective phase A and phase B windings. The FIG. 9(a) torque curves illustrate that the narrow rotor poles coming into flux communication with the energized phase windings produce greater torque ripple at higher phase energization currents, e.g., 2.5 A and 3.0 A, and lower torque ripple at lower phase energization currents, e.g., 2.0 A and 1.5 A. Specifically, with reference to the 3.0 A torque curve of FIG. 9(a), between 15 and 22.5 degrees rotor position, the increasing inductance of the energized phase B windings, from the wide rotor poles moving into a minimum reluctance position with the stator poles, imparts a torque onto the rotor. Around 19 degrees rotor position, however, the wide and narrow rotor poles interact with the energized phase B windings to produce a torque dip. It is believed that this torque dip results from the magnetic saturation of the edge of the narrow poles first coming into flux communication with the energized phase windings. As the narrow rotor poles advance into greater flux communication with the energized phase windings, the distribution of the magnetic flux therethrough increases thereby avoiding localized magnetic saturation of the narrow rotor pole. This increased distribution of magnetic flux in the narrow rotor pole in turn results in the rotor experiencing an increase in torque as the rotor advances to 22.5 degrees rotor position. Similar comments apply in respect of the torque on the rotor from the cooperation of the increasing inductance of the excited phase A windings at 64 and 154 degrees rotor position and the excited phase B windings at 109 degrees rotor position. It should be noted in FIG. 9(a) that torque dip decreases with decreasing phase energization current.

The energization of the phase A and phase B windings are selected to coincide with the position of the rotor relative to the stator. In FIG. 9(b), the energization of the phase A and phase B windings are illustrated as overlapping to take advantage of the increasing inductance of the respective phase A and phase B windings as a function of rotor position. In this manner, the rotor experiences minimal torque ripple with rotor rotation. It is to be appreciated, however, that the torque curves and energization profiles of FIG. 9(a)–(b) are for illustration purposes and should not to be construed as limiting the invention. Specifically, the overlap of the energization of the phase A and phase B windings could be more or less, or the energization of the phase A and phase B windings could have no overlap depending on, without limitation, the inductance of the windings, the capacity of the commutation electronics to quickly deenergize the phase windings, the rotational speed of the rotor and/or the desired operating characteristics of the motor.

Figure 10:
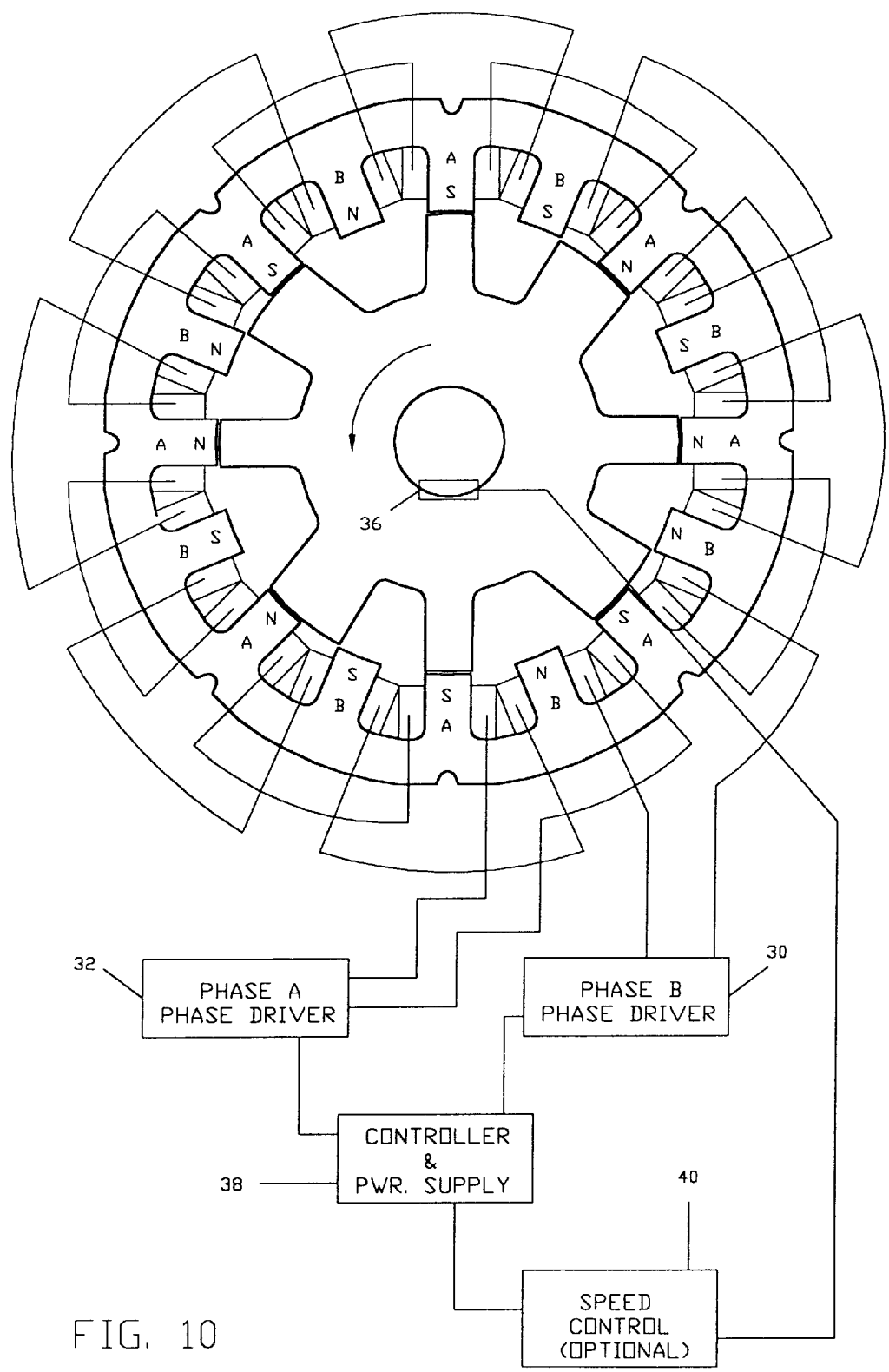
FIG. 10 is a sectional view of an 16/8 switched reluctance motor in accordance with the present invention.

The above embodiments have been described with respect to a two phase 8/4 SR motor, however, it is to be appreciated by one skilled in the art that the 8/4 embodiment set forth above is extendable to embodiments of two phase SR motors having different numbers of rotor and stator poles. One such embodiment includes the 16/8 SR motor illustrated in FIG. 10 wherein the motor includes phase A and phase B windings disposed around alternating stator poles and connected to phase A and phase B phase drivers, a controller/power supply, and an optional position sensor. In FIG. 10 the polarity of the phase A and phase B poles is not to be construed as limiting the invention or as an indication that the phase windings are energized.

With reference to FIG. 11(a)–(c) a 4/2 SR motor embodiment in accordance with the present invention is illustrated. The motor has a stator 60 comprised of a plurality of inwardly extending poles 62(a)–62(d) defining a central bore 64. A rotor 66, comprised of two outwardly extending poles 68(a)–(b), is disposed in the central bore for rotation therein. Phase windings 70 and 72 are disposed around opposing stator poles 62(b)–(d) and opposing stator poles 62(a)–(c) respectively for generating magnetic fields that extend from the stator poles into the central bore. The phase windings 70 and 72 are connected to the phase A phase driver 30 and the phase B phase driver 32 respectively such that current flows through the phase windings in one direction. A position sensor 36 is connected between the rotor and stator for determining the position of the rotor relative to the stator. The position sensor has an output connected to controller 38 for reporting the angular position of the rotor relative to the stator. The controller 38 is connected to the phase A and phase B phase drivers for controlling the firing of the respective phases in accordance with the position of the rotor relative to the stator. In FIGS. 11(b)–(c), the phase windings, the phase drivers, the controller/power supply, the position sensor and the optional speed control of FIG. 11(a) are omitted to facilitate uncluttered views of the rotor and stator. To facilitate an understanding of when the omitted phase windings of FIGS. 11(b)–(c) are energized, however, the stator poles associated with an excited phase are marked with an 'N' or an 'S' to signify a north or south pole respectively.

In operation, starting from the zero degree CCW rotor position of FIG. 11(a), the controller 38 causes the phase B phase driver 32 to energize the phase B windings 72 in the absence of energization of the phase A windings. The energization of the phase B windings produces a flux that traverses, without limitation, path 74 passing through energized phase B North pole 62(c), wide rotor pole 68(a), deenergized phase A stator pole 62(b), and the back iron, or yoke, 76 extending between stator poles 62(b) and 62(c). In response to the flux traversing path 76, the rotor experiences a CCW torque causing the rotor to align the wide rotor pole with the energized phase B North pole 62(c). Advancement of the rotor to the 45 CCW degree position of FIG. 11(b), causes the flux to traverse, without limitation, path 78 passing through phase B North pole 62(c), rotor poles 68(a)–(b), phase B South pole 62(a), and the back iron, or yoke, 76 between phase B poles 62(a) and 62(c). At 45 degree CCW rotor position, the wide rotor pole and the energized phase B North pole 62(c) are in a minimum reluctance position with respect to each other because of the relatively constant gap 80 formed therebetween. The inductance of the phase B winding is increasing, however, due to the narrow rotor pole 68(b) moving to a minimum reluctance position with phase B South pole 62(a). Accordingly, the rotor experiences a CCW torque from the interaction of the energized phase B windings and the narrow rotor pole while experiencing little or no torque from the interaction of the wide rotor pole with the energized phase B windings. In this manner torque experience by the rotor shifts from the wide rotor pole to the narrow rotor pole. In FIG. 11(c), at 90 degrees CCW rotor position, the wide and narrow rotor poles are in minimum reluctance position with poles 62(c) and 62(a) of the energized phase B windings. Accordingly, at this position no torque is imparted to the rotor from the energization of the phase B windings. Energizing the phase A windings associated with poles 62(b) and 62(d), however, causes flux to traverse, without limitation, path 82 passing through energized phase A South pole 62(d), wide rotor pole 68(a), phase B stator pole 62(c), and the back iron, or yoke, 76 extending between stator poles 62(c) and 62(d). In response to the flux traversing path 82, the rotor experiences a CCW torque causing the rotor to align the wide rotor pole with the energized phase A South pole 62(d). To avoid having the rotor experience a CW (negative) torque, from the energization of the phase B windings in cooperation with the decreasing inductance thereof, the phase B windings are deenergized. In this manner torque experienced by the rotor shifts from the phase B windings to the phase A windings.

In the foregoing description of a 4/2 SR motor, the rotor is advanced through 90 mechanical degrees by the selective energization and deenergization of the phase A and phase B windings in relation to the position of the rotor relative of the stator. It is to be appreciated, however, that the above description is extendable to movement of the rotor beyond 90 mechanical degrees. Moreover, it is also to be appreciated that, because the rotor of FIGS. 11(a)–(c) is non-uniform around the desired center of rotation 40, it is necessary to add weight to the narrow rotor pole or remove material from the wide rotor pole to have the actual center of rotation coincide with the desired center of rotation.

Figure 12:
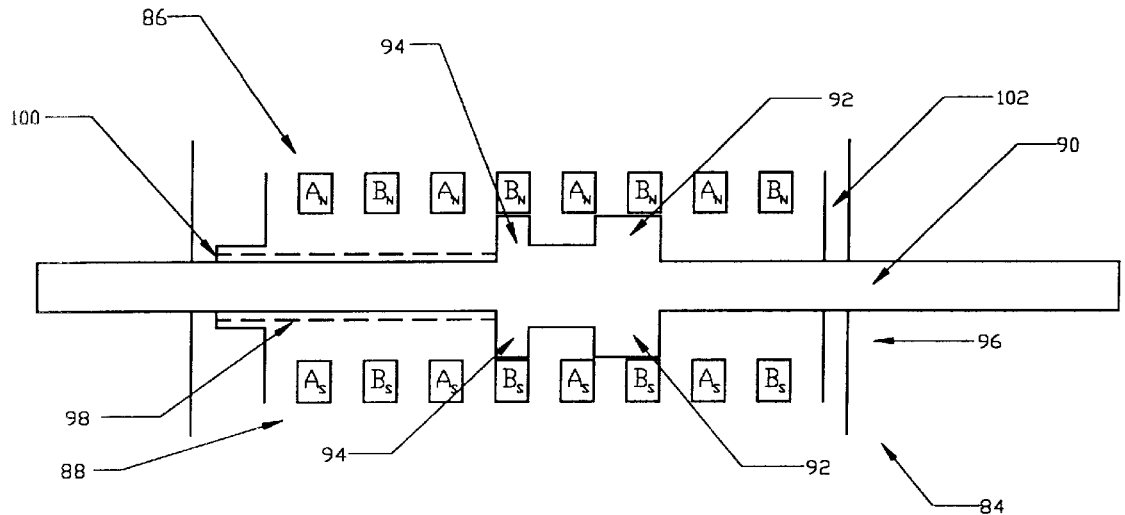
FIG. 12 is a linear actuator in accordance with the present invention.

With reference to FIG. 12, a unidirectional linear actuator 84 in accordance with the present invention is illustrated. It is to be understood that the linear actuator of FIG. 12 includes phase A and phase B windings disposed around stationary poles 86, 88 and connected to phase A and phase B phase drivers and a controller/power supply. Like the embodiment illustrated in FIG. 2, however, the phase windings, the phase drivers and the controller/power supply of FIG. 12 have been omitted to facilitate an uncluttered view of the linear actuator. The actuator includes a plunger 90 disposed for linear movement between stationary poles 86, 88. The omitted phase windings are disposed around the stationary poles such that the poles 86 on one side of the plunger are north "N" poles while the poles 88 on the other side of the plunger are south "S" poles. The phase A and phase B windings are alternately disposed on adjacent stationary poles and adjacent stationary poles are disposed one pole width apart. The plunger includes a wide pole pair 92 and a narrow pole pair 94 disposed on opposite sides of a longitudinal axis of the plunger. The narrow poles are the same width as a stationary pole while the wide poles are twice as wide as a stationary pole. Starting from the position shown in FIG. 12, the plunger is urged leftward 96 by the selective energization of the phase A and phase B windings. Specifically, as with the embodiment illustrated in FIGS. 5(a)–5(f), the energization and deenergization of the phase A and phase B windings is coordinated such that the plunger is urged leftward to minimize the reluctance path between the poles associated with the energized phase windings and the poles of the plunger. When the plunger has reached the left most position, it is maintained threat by continuous energization of the phase A windings. A compressible spring 98 disposed between the narrow poles 94 and a left-most stop 100, such as an end of a housing or support that holds the plunger and stationary poles relative to each other, provides for the return of the plunger rightward when the phase windings are deenergized.

Alternatively, the stationary poles are disposable on one side of the actuator with the phase A and phase B windings disposed on alternating poles and forming north-south pole pairs, and the actuator poles are disposed on a side of the actuator. The actuator is disposed relative to the stationary poles such that the actuator poles and stationary poles are movable in spaced relation to each other. Moreover, while the spring in the above example is disposed for compression, it is to be appreciated that the spring could also be disposed between the wide poles and a rightmost stop 102 for extension therebetween during operation. The extended spring providing for the return of the plunger rightward when the phase windings are deenergized.

Figure 13A:
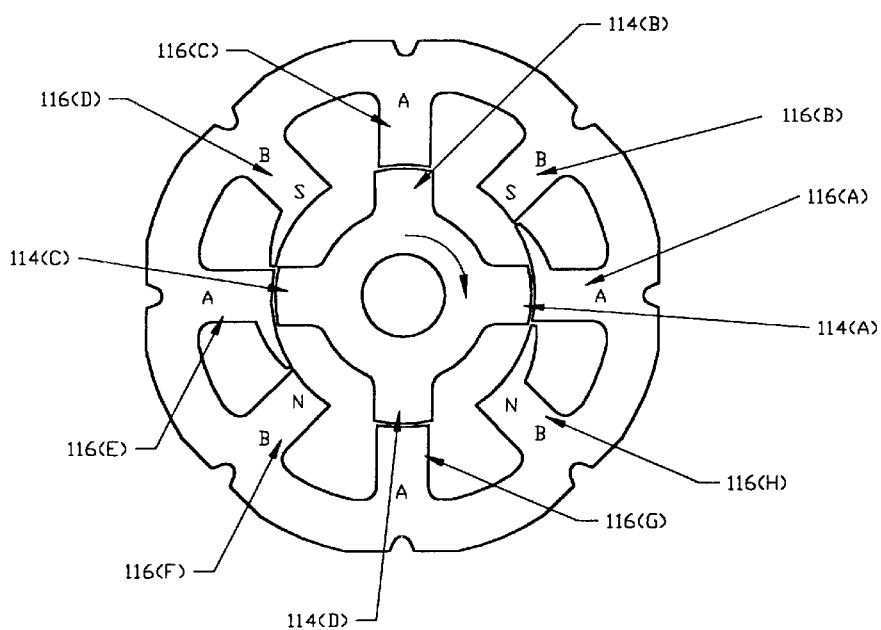
FIG. 13(a)–13(e) are isolated views of a rotor and stator in accordance with a stator implementation of the present invention showing mechanical progression of the rotor in a CW direction relative to the stator in response to the generation of north and south pole pairs by the excitation of phase A and phase B windings, removed for illustration purposes.
Figure 13B:
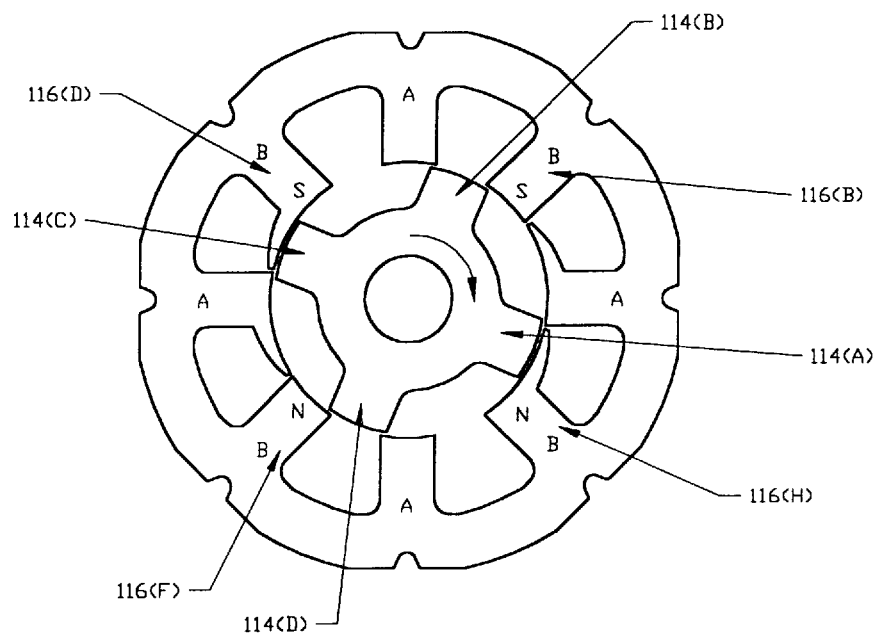
Figure 13C:
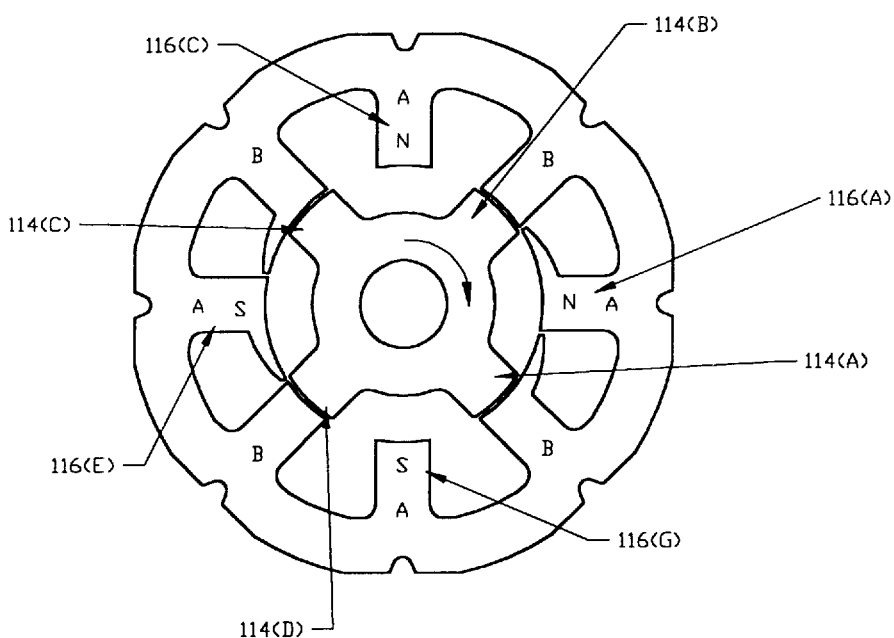
Figure 13D:
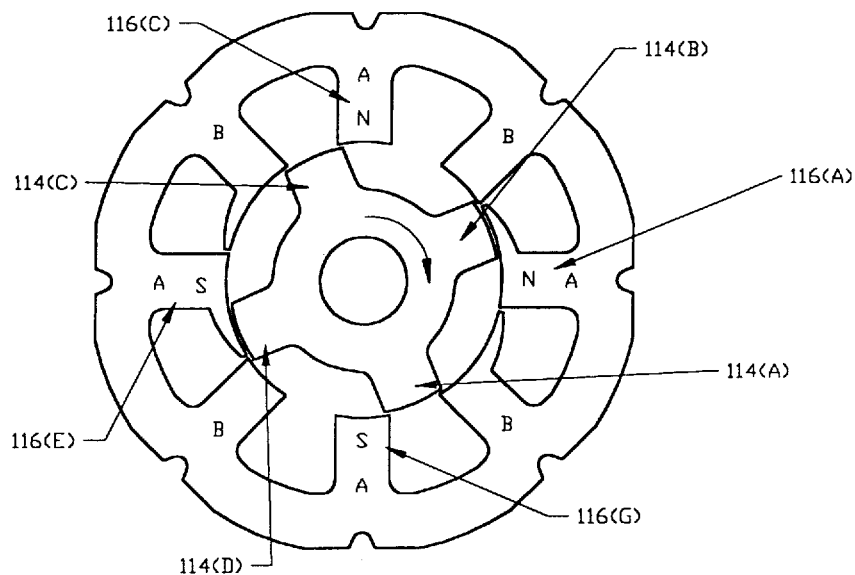
Figure 13E:
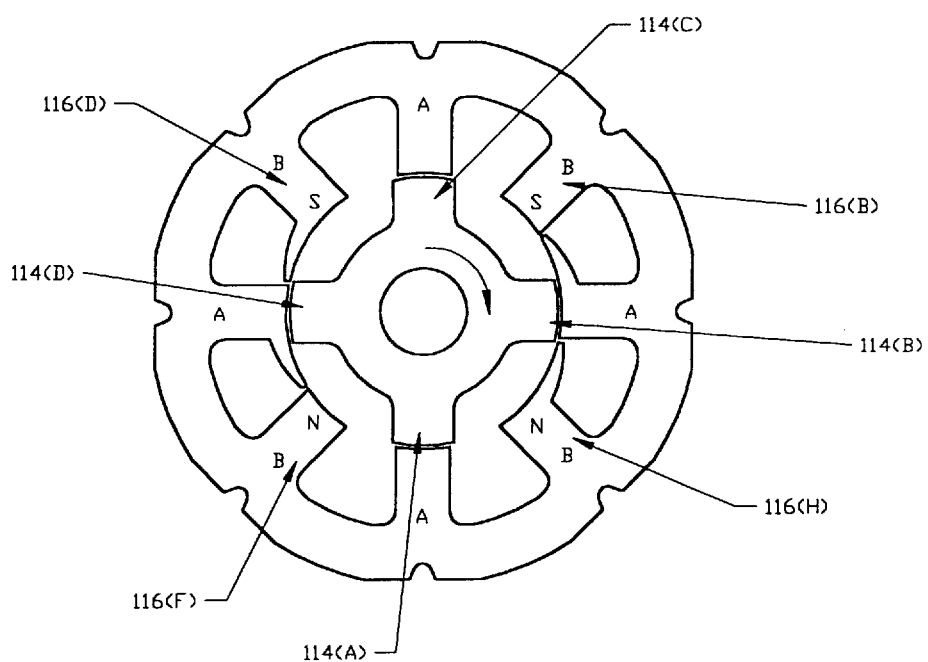

With reference to FIGS. 13(a)–13(e), an alternate embodiment of the invention is illustrated wherein the stationary element 110, i.e., the stator, includes the novel pole arrangement and wherein the moving element 112, i.e., the rotor, has uniformly displaced poles. It is to be understood that in FIGS. 13(a)–13(e), as with the embodiment of FIGS. 5(a)–5(f), the phase windings, the phase drivers, the controller/power supply, the position sensor and the optional speed control are associated therewith but have been omitted to facilitate an uncluttered view thereof. To facilitate an understanding of when the omitted phase windings are energized, the poles associated with an excited phase are marked with either an 'N' or an 'S' to signify a north or south pole respectively. The pole arrangement of FIGS. 13(a)–13(e) is configured such that the rotor 112 progresses in a CW direction in response to the selective energization of the phase windings. From the zero degree rotor position of FIG. 13(a), the phase B windings are energized and the phase A windings are deenergized. This excitation produces a CW torque on the rotor causing alignment of the rotor poles 114(a) and 114(c) with excited phase B stator poles 116(d) and 116(h), i.e., the rotor poles move into minimum reluctance position with respect to the energized phase B poles—the minimum reluctance position corresponding to the maximum inductance of the energized phase windings producing said alignment. In FIG. 13(b), at 22.5 degrees CW rotor position, the rotor poles 114(a) and 114(c) and the wide phase B stator poles 116(d) and 116(h) have moved to a lower reluctance position with respect to each other. The reluctance path between the stator poles of the energized phase B windings and the rotor poles, however, continues decreasing as the rotor poles continue moving into alignment with the energized phase B stator poles. Specifically, the rotor experiences a torque due to the interaction of rotor poles 114(b) and 114(d) with the narrow phase B stator poles 116(b) and 116(f). Moreover, in the absence of rotor poles 114(a) and 114(c) being in a minimum reluctance position with respect to wide phase B stator poles 116(d) and 116(h), the rotor also experiences a torque therefrom. In this manner, in the presence of energized phase B windings, torque imparted to the rotor shifts from the wide phase B stator poles to the narrow phase B stator poles. In FIG. 13(c), at 45 degrees CW rotor position, the rotor poles are in minimum reluctance position with respect to the phase B stator poles and therefore, no torque is imparted to the rotor from the energization of the phase B windings. Energizing the phase A windings, however, causes flux to flow from wide phase A stator poles 116(a) and 116(e) through rotor poles 114(b) and 114(d). In response to flux flowing therethrough, the rotor experiences a CW torque causing rotor poles 114(b) and 114(d) to align with the wide stator poles 116(a) and 116(e). It is to be appreciated, that as the rotor moves past 45 degrees CW rotor position the phase B windings experience an increase in reluctance between the stator poles of the phase B windings and the rotor poles. To avoid having the rotor experience a CCW torque from energization of the phase B windings in cooperation with the increasing reluctance thereof, the phase B windings are deenergized. In this manner, the torque experienced by the rotor shifts from the phase B windings to the phase A windings. In FIG. 13(d), at 67.5 degrees CW rotor rotation, the rotor poles 114(b) and 114(d) and wide phase A stator poles 116(a) and 116(e) have moved to a lower reluctance position with respect to each other. The reluctance path between the stator poles of the energized phase A windings and the rotor poles, however, continues decreasing as the rotor poles move into further alignment with the energized phase A stator poles. Specifically, the rotor experiences a torque due to the interaction of rotor poles 114(a) and 114(c) with the narrow phase A stator poles 116(c) and 116(g). Moreover, in the absence of rotor poles 114(b) and 114(d) being in a minimum reluctance position with respect to the phase A stator poles 116(a) and 116(e), the rotor also experiences a torque therefrom. In this manner, in the presence of the energized phase A windings, torque imparted to the rotor shifts from the wide phase A stator poles to the narrow phase A stator poles. In FIG. 13(e), at 90 degrees CW rotor rotation, the phase A stator poles are in minimum reluctance alignment with the rotor poles and therefore, the rotor experiences no torque from the Interaction of the wide rotor poles with the phase A windings. At this position, however, it is to be appreciated that the rotor poles and stator poles are in a position similar to the 0 degree CW rotor position of FIG. 13(a). Accordingly, the description set forth above for FIGS. 13(a)–13(d) is applicable hereinafter for advancing the rotor beyond 90 degrees CW rotor position.

Figure 14:
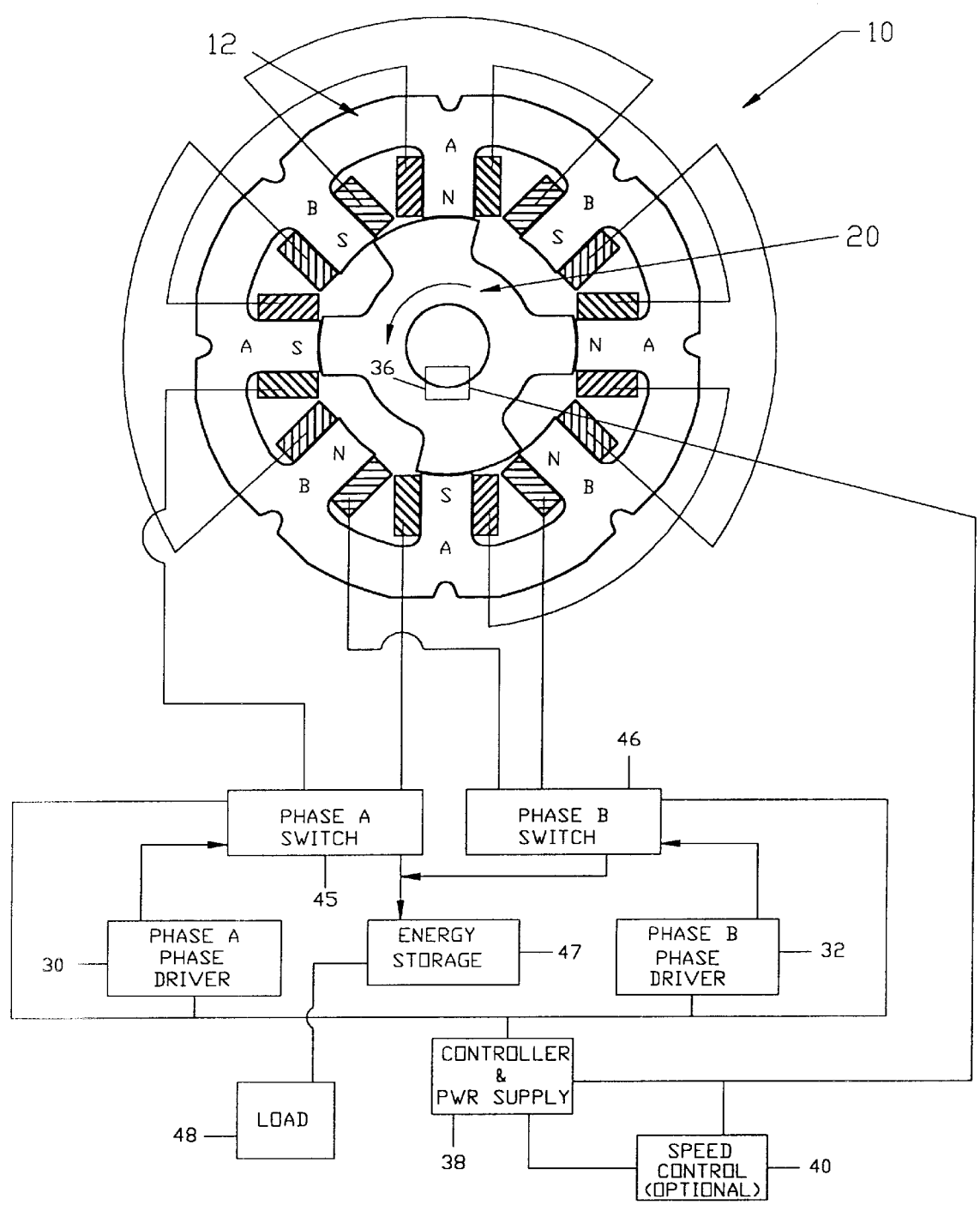
FIG. 14 is a sectional view of a switched reluctance motor-generator in accordance with the present invention with associated control and operational circuitry connected thereto.

In certain applications, such as aircraft, it is desirable to have a motor also operate as a generator. Specifically, the motor is initially used to start, for example, an internal combustion engine, however, once running, the engine drives the rotor such that the motor is useable as a generator. The present invention is suitable for such applications. With reference to FIG. 14, a sectional view of a motor-generator (M-G) 10 in accordance with the present invention with associated control and operational circuitry connected thereto is illustrated. The M-G includes series wound phase A windings and phase B windings connected to switches 45 and 46 respectively. The phase A switch selectively connects the phase A windings to phase A driver 30 or energy storage means 47. Similarly, phase B switch selectively connects the phase B windings to phase B driver 32 or energy storage means 47. Controller 38 is connected to the phase switches and the phase drivers for controlling the operation thereof. The energy storage means stores electrical energy produced by the generator operation of the M-G in a manner known in the art. When operated as a motor, the controller 38 causes phase A switch 45 and phase B switch 46 to connect their respective phase drivers to the phase windings. The motor is then operated in the manner set forth above in conjunction with the embodiment of FIGS. 5(a)–5(f) to rotate the rotor 20 CCW. When used as a generator, however, the controller 38 causes the phase A switch and phase B switch to alternately switch between their respective phase drivers and the energy storage means in coordination with the position of the rotor relative to the stator. Specifically, by way of example and not of limitation, when used as a generator, the rotor 20 is driven by an external source such as an internal combustion engine. With the poles of the rotor in a minimum reluctance position with respect to the poles of the phase A windings, as illustrated in FIG. 14, the controller 38 causes the phase A phase driver to introduce a first current into the phase A windings thereby inducing a magnetic field therein. Next, the controller causes the phase A switch to connect the phase A windings to the energy storage means. The external source driving the rotor and stator poles out-of minimum reluctance position, in conjunction with the magnetic field of the phase A windings, induces in the phase A windings a second current that acts to maintain the magnetic field. This second current charges the energy storage means 47 which in turn provides electrical energy to a load 48, such as lights, aircraft electronics and the like. As the rotor poles are driven into alignment with the phase B stator poles the controller coordinates the operation of the phase B phase driver and the phase B switch as a function of rotor positions such that the phase B windings charge the electrical storage means in the same manner as the above described phase A windings.

It is believed that driving the rotor of FIG. 14 CW, versus CCW, produces a change in reluctance between the poles of the rotor and stator that occurs over greater angular position of the rotor relative to the stator than in the above described generator embodiment or the prior art. It is believed that this change in reluctance over greater angular position advantageously provides current waveforms having more uniform amplitude, longer durations with less time between current waveforms wherein no current is produced.

The above embodiments have been described with respect to two phase SR motors and generators, however, it is to be appreciated by one skilled in the art that the invention described herein is applicable to SR motor/generators having 3 or more phases, to motors having differing numbers of stator poles and rotor poles as well as to linear motors. Lastly, in the above described embodiments the stationary element has been referred to as the stator and the rotating or moving element has been referred to as the rotor. It is to be appreciated, however, that the choice of this convention is not to be construed as limiting the invention and in application the rotor or moving element of the above described embodiment could be stationary while the stator of the above described embodiment could be the rotating or moving element.

While the invention has been described with reference to the preferred embodiments, obvious modifications and alterations will occur to others upon reading and understanding the preceding specification. It is intended that the invention be construed as including all such alterations and modifications to the full extent they come within the scope of the following claims or the equivalents thereof.

Having described the preferred embodiment the invention is now claimed to be:

1. A switched reluctance machine comprising:
   a first element having a plurality of uniformly-spaced like poles;
   a second element comprised of a first pole having a pole face of a first size and a second pole having a pole face of a second size, said first pole being spaced from said second pole in a predetermined direction; and
   windings for two phases wound about poles of said first element such that each pole is separated by a winding and associated pole of a different phase;
   said first element disposed relative to said second element wherein energization of one of said two phases causes said second element to be movable a predetermined distance in said predetermined direction in spaced relation relative to said first element, said first pole of said second element being in minimum reluctance relation with a first uniform pole of said first element when said second element has moved a first portion of said predetermined distance, and said second pole of said second element being in a minimum reluctance relation with a second uniform pole of said first element when said second element has moved another portion of said predetermined distance, said first pole of said second element remaining in a minimum reluctance relation with said first uniform pole of said first element when said second pole of said second element is in a minimum reluctance relationship with said second uniform pole of said first element.

2. The switched reluctance machine as set forth in claim 1 wherein the face of the first pole is about twice the width of one of the plurality of uniform poles and wherein the face of the second pole is about the same width as one of the plurality of uniform poles.

3. The switched reluctance machine as set forth in claim 2 wherein adjacent uniform poles form a space therebetween.

4. The switched reluctance machine as set forth in claim 3 wherein the space between adjacent uniform poles is about the width of one of said uniform poles.

5. The switched reluctance machine as set forth in claim 1 wherein the poles of the first and second elements extend radially, the face of each uniform pole traversing a first angle and the face of the first pole traversing a second angle, said second angle being approximately twice the first angle.

6. The switched reluctance machine as set forth in claim 5 wherein the face of the second pole traverses approximately the same angle as the face of each uniform pole.

7. The switched reluctance machine as set forth in claim 1 further including:
a phase winding disposed around a pole of the first element;
a phase driver for energizing said phase winding; and
a controller for controlling the operation of the phase driver in coordination with the position of the first element relative to the second element.

8. The switched reluctance machine as set forth in claim 7 further including:
an energy storage means; and
a switch operatively connected to the controller for selectively connecting the phase winding between one of the phase driver and the energy storage means.

9. A switched reluctance motor, comprising:
a stator having an even number "n" of magnetically permeable stator poles evenly spaced circumferentially about a central axis, each of said stator poles facing said axis and traversing a first stator angle;
a rotor mounted for rotation relative to said stator about said axis, said rotor having an even number of magnetically permeable rotor poles spaced about said axis, the number of rotor poles being ½ n, said rotor poles including at least one narrow pole having a narrow face that traverses a first rotor angle, said first rotor angle being approximately equal to said first stator angle, and at least one wide pole having a wide face that traverses a second rotor angle approximately twice said first rotor angle, said rotor poles being distributed on said rotor wherein said at least one narrow rotor pole and said at least one wide rotor pole move along a same circumferential path and said narrow pole face is spaced from a wide pole face on one side by a first angle equal to about twice (2) said first stator angle and on another side by a second angle equal to about three (3) times said first stator angle.

10. The motor as set forth in claim 9, further including a plurality of windings associated with the poles of the stator for connection to a polyphase source such that energization of a phase of the polyphase source forms at least one pair of magnetic poles on the stator that imparts a torque to the poles of the rotor, wherein energization of the phase imparts onto the rotor a torque that appears substantially on the wide pole face for a first part of said phase energization and appears substantially on the narrow pole face for a second part of said phase energization.

11. A switched reluctance motor driven by a two phase source, comprising:
a stator having a yoke and a plurality of evenly spaced, like stator poles distributed on said yoke defining a gap between each stator pole;
windings for each of the two phases of the motor wound about stator poles that are circumferentially separated by a winding and an associated stator pole of a different phase; and
a rotor mounted for rotation about an axis through said stator, said rotor having a wide rotor pole and a narrow rotor pole, said rotor poles being distributed on said rotor angularly spaced apart about said axis, said rotor poles being dimensioned such that when a first half of said wide rotor pole is in alignment with a first stator pole, said narrow rotor pole is aligned with a gap adjacent a second stator pole and when a second half of said wide rotor pole is in alignment with said first stator pole, said narrow rotor pole is aligned with said second stator pole.

12. A switched reluctance motor as defined in claim 11, wherein said second half of said wide rotor pole is in alignment with a gap adjacent said first stator pole when said narrow rotor pole is aligned with said second stator pole.

13. A switched reluctance motor as defined in claim 11, wherein said first stator pole and said second stator pole have the same phase.

14. A switched reluctance motor driven by a two phase source comprising:
a stator having a yoke and a plurality of like poles, each having a stator pole face, said poles being evenly distributed on said yoke and defining a gap between each pole;
windings for each of the phases of said motor wound about stator poles that are circumferentially separated by at least one winding and an associated stator pole of a different phase; and
a rotor mounted for rotation relative to said stator, said rotor having two diametrically opposite, outwardly projecting wide rotor poles, and two diametrically opposite, outwardly projecting narrow rotor poles, each of said wide rotor poles having a wide rotor pole face and each of said narrow rotor poles having a narrow rotor pole face, said rotor poles being distributed on said rotor wherein a narrow rotor pole is disposed to each side of a wide rotor pole in a direction of rotation, said rotor poles being dimensioned such that said narrow pole face is approximately equal to a stator pole face and said wide rotor pole face spans approximately the pole face of a first stator pole and the gap adjacent said first stator.

15. A switched reluctance motor comprised of:
a stator having a yoke and a "n" number of evenly spaced like stator poles distributed on said yoke, the "n" number of stator poles being a whole multiple of four;
a rotor mounted for rotation relative to said stator having a plurality of rotor poles, the number of rotor poles being one-half the "n" number of stator poles, half of said rotor poles being wide rotor poles and half of said rotor poles being narrow rotor poles, said rotor poles being distributed on said rotor wherein a narrow rotor pole is disposed on each side of a wide rotor pole in each direction of rotation, said rotor dimensioned such that said narrow rotor poles have pole faces approximately equal to the pole faces of said stator poles and said wide rotor pole has a pole face approximately equal to the pole face of a stator pole and the gap between two stator poles; and windings for two phases wound about stator poles that are circumferentially separated by at least one winding and an associated stator pole of a different phase, said at least one winding creating a pair of adjacent energized stator poles having the same polarity, said motor creating a ¼ n stator and rotor pole interactions that change to ½ n stator and rotor pole interactions during each phase energization.

16. A switched reluctance motor as defined in claim 15, wherein a pair of adjacent stator poles of the same phase are connected to have the same polarity.

17. A switched reluctance motor driven by a two phase source, comprising:

a stator having a yoke and a plurality of evenly spaced like poles distributed on said yoke defining a gap between each stator pole;

windings for each of the two phases of the motor wound about stator poles that are circumferentially separated by a winding and an associated stator pole of a different phase; and a rotor mounted for rotation relative to said stator, said rotor having a wide rotor pole and a narrow rotor pole, said rotor poles being distributed on said rotor wherein a narrow rotor pole is disposed to each side of a wide rotor pole in a direction of rotation, said rotor poles being dimensioned such that the energization of one of said two phases causes said wide rotor pole to interact with a first stator pole to induce a first torque on said rotor and to produce a first predetermined angular rotation of said rotor, and thereafter causes said narrow rotor pole to interact with a second stator pole to induce a second torque on said rotor and to produce a second predetermined angular rotation of said rotor.

18. A switched reluctance motor as defined in claim 17, wherein said first stator pole and said wide rotor pole do not produce an opposing torque when said first narrow rotor pole interacts with said second stator pole to produce said second predetermined rotation.

19. A switched reluctance motor as defined in claim 17, wherein said first predetermined angular rotation of said rotor causes said wide rotor pole to move into a minimum reluctance position with said first stator pole, and said second predetermined angular rotation causes said narrow rotor pole to move into minimum reluctance position with said second stator pole.

20. A switched reluctance motor driven by a two phase source, comprising:

a stator having a yoke and a plurality of evenly distributed, like stator poles thereon, each of said stator poles having a stator pole face;

windings for each of the two phases of said motor wound about stator poles that are circumferentially separated by at least one winding and an associated stator pole of a different phase; and a rotor mounted for rotation relative to said stator, said rotor having a wide rotor pole having a wide rotor pole face and a narrow rotor pole having a narrow rotor pole face, said rotor poles being distributed on said rotor wherein said narrow rotor pole and said wide rotor pole travel along a same circumferential path, said rotor poles being dimensioned such that energization of one of said phases causes a predetermined angular rotation of said rotor wherein a first portion of said angular rotation is created by said wide rotor pole being drawn into a minimum reluctance position relative to one of said energized stator poles and the other portion of said angular rotation is created by said narrow rotor pole being drawn into a minimum reluctance position with another of said energized stator poles, said wide rotor pole being in a minimum reluctance position when said narrow rotor pole is in a minimum reluctance position.

21. A switched reluctance motor as defined in claim 20, wherein the area of overlapping faces of said rotor poles and said stator poles increases generally uniformly during said predetermined angular rotation of said rotor.

22. A switched reluctance motor as defined in claim 21, wherein a narrow rotor pole face is approximately equal to a stator pole face and a wide rotor pole face is approximately twice the width of a stator pole face.

23. A switched reluctance motor as defined in claim 22, wherein a narrow rotor pole face is slightly larger than a stator pole face and a wide rotor pole face is slightly larger than twice the width of a stator pole face.

24. A switched reluctance motor driven by a two phase source, comprising:

a stator having a yoke and a plurality of like poles evenly distributed on said yoke to define a uniform gap between each pole, each of said poles having a stator pole face;

windings for each of the two phases of said motor wound about said stator poles that are circumferentially separated by at least one winding and an associated stator pole of a different phase; and a rotor mounted for rotation relative to said stator, said rotor having a wide rotor pole having a wide rotor pole face and a narrow rotor pole having a narrow rotor pole face, said rotor poles distributed on said rotor wherein said narrow rotor pole and said wide rotor pole travel along a same circumferential path, said rotor poles being dimensioned such that a uniform gap is defined between said rotor pole faces and said stator pole faces and wherein energization of one of said two phases causes said wide rotor pole to magnetically interact with a first stator pole and said narrow rotor pole to magnetically interact with a second stator pole to cause said rotor to rotate a predetermined angular amount, and causes an area of overlap of said rotor pole faces relative to said stator pole faces to increase at a generally uniform rate as said rotor moves said predetermined angular amount.

25. A switched reluctance motor as defined in claim 24, wherein said motor has an inductance profile related to angular rotation for each phase wherein said inductance increases over a first angle of rotation and decreases over a second angle of rotation, and said first angle of rotation is substantially greater than said second.

26. A switched reluctance motor as defined in claim 25, wherein said first angle of rotation is approximately twice said second angle of rotation.

27. A switched reluctance motor driven by a two phase source comprising:

a stator having a yoke and a plurality of like poles evenly distributed on said yoke, each of said poles having a stator pole face;

windings for each of the two phases of said motor wound about said stator poles that are circumferentially separated by at least one winding and an associated stator pole of a different phase; and a rotor mounted for rotation relative to said stator, said rotor having a wide rotor pole having a wide rotor pole face and a narrow rotor pole having a narrow rotor pole face, said rotor poles distributed on said rotor wherein said narrow rotor pole and said wide rotor pole travel along a same circumferential path, said rotor poles being dimensioned relative to said stator poles such that said motor has an inductance-to-angular rotation profile wherein the inductance of a phase increases over a first angle of rotation and decreases over a second angle of rotation and said first angle of rotation is approximately twice said second angle of rotation.

28. A switched reluctance motor, comprised of:

a stator having a yoke and a plurality of evenly spaced like stator poles distributed on said yoke defining a gap between each stator pole, the number of stator poles being a whole multiple of four and each of said stator poles having a stator pole face wherein the length of said stator pole face in a direction of rotation is approximately equal to the gap defined between each stator pole;

a rotor mounted for rotation relative to said stator, said rotor having a plurality of rotor poles, the number of rotor poles being one-half the number of stator poles and half of said rotor poles being wide rotor poles and half of said rotor poles being narrow rotor poles, said rotor poles being distributed on said rotor wherein a narrow rotor pole and a wide rotor pole travel in a same circumferential path, said rotor dimensioned such that said narrow rotor poles have pole faces approximately equal to the pole faces of said stator poles and said wide rotor pole has a pole face greater than the pole face of a stator pole; and windings for two phases wound about stator poles that are circumferentially separated by at least one winding and an associated stator pole of a different phase, said windings creating a pair of adjacent, energized stator poles having the same polarity.

* * * * *